(12) United States Patent
Wigren

(10) Patent No.: US 9,320,053 B2
(45) Date of Patent: *Apr. 19, 2016

(54) ADAPTIVE LOAD PREDICTION FOR INTERFERENCE SUPPRESSION RECEIVERS

(75) Inventor: Karl Torbjörn Wigren, Uppsala (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 679 days.

This patent is subject to a terminal disclaimer.

(21) Appl. No.: 13/314,775

(22) Filed: Dec. 8, 2011

(65) Prior Publication Data

US 2012/0147828 A1    Jun. 14, 2012

Related U.S. Application Data

(60) Provisional application No. 61/448,855, filed on Mar. 3, 2011, provisional application No. 61/421,754, filed on Dec. 10, 2010.

(51) Int. Cl.
*H04W 74/04* (2009.01)
*H04W 72/12* (2009.01)

(52) U.S. Cl.
CPC ...... *H04W 72/1268* (2013.01); *H04W 72/1252* (2013.01)

(58) Field of Classification Search
CPC ...................... H04W 72/1252; H04W 72/1268
USPC ........................................................ 370/329
See application file for complete search history.

(56) References Cited

U.S. PATENT DOCUMENTS

| 8,135,349 | B2 | 3/2012 | Hwang et al. | |
|---|---|---|---|---|
| 8,605,842 | B2 | 12/2013 | Wigren | |
| 8,665,937 | B2 | 3/2014 | Wigren | |
| 8,670,478 | B2 | 3/2014 | Kangas et al. | |
| 8,717,924 | B2 * | 5/2014 | Wigren et al. | 370/252 |

(Continued)

FOREIGN PATENT DOCUMENTS

| EP | 2053758 A1 | 4/2009 |
|---|---|---|
| WO | 2008039123 A1 | 4/2008 |

(Continued)

OTHER PUBLICATIONS

Wigren, T., "Soft Uplink Load Estimation in WCDMA", IEEE Transactions on Vehicular Technology, vol. 58, No. 2, Feb. 2009, pp. 760-772.

(Continued)

*Primary Examiner* — Jung Park
*Assistant Examiner* — Albert Shih
(74) *Attorney, Agent, or Firm* — Coats & Bennet, PLLC

(57) ABSTRACT

Load measurements having low computational complexity are provided that give an effective load after interference suppression. The effective load after interference may be compared with the air interface load to determine interference suppression gains for different user constellations. The interference suppression gains may be stored in the form of a gain table that gives the expected interference suppression gains for different user constellations. The expected interference suppression gains may be used by a scheduler at a base station to predict the effective load for two or more candidate user constellations, and to select one of the candidate user constellations. Users are then scheduled according to the selected user constellation.

36 Claims, 8 Drawing Sheets

(56) References Cited

U.S. PATENT DOCUMENTS

| | | |
|---|---|---|
| 2002/0071508 A1 | 6/2002 | Takada et al. |
| 2007/0054619 A1 | 3/2007 | Kinnunen et al. |
| 2009/0052564 A1 | 2/2009 | Hayashi et al. |
| 2009/0088080 A1* | 4/2009 | Zhang et al. .......... 455/63.1 |
| 2009/0207746 A1 | 8/2009 | Yuan et al. |
| 2010/0214964 A1 | 8/2010 | Larsson et al. |
| 2011/0195731 A1 | 8/2011 | Jang et al. |
| 2012/0076248 A1 | 3/2012 | Rosenqvist |
| 2013/0242744 A1* | 9/2013 | Wigren et al. .......... 370/236 |
| 2014/0334455 A1* | 11/2014 | Wigren et al. .......... 370/335 |

FOREIGN PATENT DOCUMENTS

| | | |
|---|---|---|
| WO | 2008097145 A1 | 8/2008 |
| WO | 2008119216 A1 | 10/2008 |
| WO | 2011031193 A1 | 3/2011 |
| WO | 2012074475 A1 | 6/2012 |

OTHER PUBLICATIONS

Ahmed, M. "Call Admission Control in Wireless Networks: A Comprehensive Survey", IEEE Communications Surveys, First Quarter 2005, vol. 7, No. 1, Jan. 1, 2005, pp. 50-69, IEEE, NY.

Thomas, J., et al., "Iterative MMSE Multiuser Interference Suppression for Coded Dispersive CDMA Wireless Channels with Multisensor Receivers", Conference Record of the Thirty-Third Asilomar Conference on Signals, Systems, and Computers, Oct. 24, 1999, pp. 225-230, vol. 1, IEEE.

Cairns, D. et al., "Experimental Evaluation of Interference Cancellation for Dual-Antenna UMTS Handset", 62nd IEEE Vehicular Technology Conference, Sep. 25, 2005, pp. 877-881, IEEE.

Dahlman, E., et al., Wider-band "single-carrier" transmission, 3G Evolution, Second Edition, 2008, Chapter 5, p. 65, HSPA and LTE for Mobile Broadband, Elsevier Ltd.

Wigren, T., et al., "Estimation of uplink WCDMA load in a single RBS", 66th IEEE Vehicular Technology Conference, Sep. 30, 2007, pp. 1-5, IEEE.

3rd Generation Partnership Project, "3rd Generation Partnership Project; Technical Specification Group Radio Access Network; Requirements for support of radio resource management (FDD) (Release 6)", Technical Specification, 3GPP TS 25.133 V6.10.0, Jun. 1, 2005, pp. 1-164, 3GPP, France.

Wigren, T., "Recursive Noise Floor Estimation in WCDMA", IEEE Transactions on Vehicular Technology, Jun. 1, 2010, pp. 2615-2620, vol. 59, No. 5, IEEE.

Lops, M., et al., "Narrow-Band-Interference Suppression in Multiuser CDMA Systems", IEEE Transactions on Communications, Sep. 1, 1998, pp. 1163-1175, vol. 46, No. 9, IEEE.

Tan, A., et al., "Modeling the Effects of Interference Suppression Filters on Ultra-Wideband Pulses", IEEE Transactions on Microwave Theory and Techniques, Jan. 1, 2011, pp. 93-98, vol. 59, issue 1, IEEE Microwave Theory and Techniques Society.

3rd Generation Partnership Project, "3rd Generation Partnership Project; Technical Specification Group Services and System Aspects; General Packet Radio Service (GPRS); Service description; Stage 2 (Release 10)", Technical Specification, 3GPP TS 23.060 V10.5.0, Sep. 1, 2011, pp. 1-321, 3GPP, France.

3rd Generation Partnership Project, "3rd Generation Partnership Project; Technical Specification Group Radio Access Network; Physical layer; Measurements (FDD) (Release 10)", Technical Specification, 3GPP TS 25.215 V10.0.0, Mar. 1, 2011, pp. 1-23, 3GPP, France.

3rd Generation Partnership Project, "3rd Generation Partnership Project; Technical Specification Group Radio Access Network; Physical layer; Measurements (TDD) (Release 10)", Technical Specification, 3GPP TS 25.225 V10.1.0, Jun. 1, 2011, pp. 1-30, 3GPP, France.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 10)", Technical Specification, 3GPP TS 23.401 V10.5.0, Sep. 1, 2011, pp. 1-282, 3GPP, France.

3rd Generation Partnership Project, "3rd Generation Partnership Project; Technical Specification Group Radio Access Network; UTRAN Iub interface Node B Application Part (NBAP) signalling (Release 10)", Technical Specification, 3GPP TS 25.433 V10.4.0, Sep. 1, 2011, pp. 1-1276, 3GPP, France.

3rd Generation Partnership Project, "3rd Generation Partnership Project; Technical Specification Group Radio Access Network; UTRAN Iur interface Radio Network Subsystem Application Part (RNSAP) signalling (Release 10)", Technical Specification, 3GPP TS 25.423 V10.4.0, Sep. 1, 2011, pp. 1-567, 3GPP, France.

\* cited by examiner

| HARQ PROC. # | 0 | 1 | 2 | 3 | 4 | 5 | 6 | 7 | 0 | 1 | 2 | 3 | 4 | 5 | 6 | 7 |
|---|---|---|---|---|---|---|---|---|---|---|---|---|---|---|---|---|
| USER CONSTELLATION | 1 | 1 | 1 | 2 | 2 | 2 | 2 | 2 | 1 | 1 | 1 | 2 | 2 | 2 | 2 | 2 |

FIG. 8

ADAPTIVE LOAD PREDICTION FOR INTERFERENCE SUPPRESSION RECEIVERS

RELATED APPLICATION

This application claims the benefit of U.S. Provisional Patent Application Ser. No. 61/448,855 filed Mar. 3, 2011 and U.S. Provisional Patent Application Ser. No. 61/421,754 filed on Dec. 10, 2010.

BACKGROUND

1. Technical Field

The present invention relates generally to uplink scheduling in a wireless communication network using interference suppression receivers at the base station, and more particularly to load prediction for interference suppression receivers.

2. Background

In some types of wireless communication systems, such as Wideband Code Division Multiple Access (WCDMA) systems, interference suppression (IS) is used in order to achieve better performance in terms of peak data rates, coverage, system throughput, and system capacity. Examples of such interference suppression receivers that are commonly used include the GRAKE+ receiver, the Frequency Domain Equalization (FDE) receiver, and the Frequency Domain Pre-Equalization (FDPE) receiver.

The Enhanced Uplink (EUL) in WCDMA employs fast scheduling and a short transmission time interval (TTI) in order to use increase total throughput on the uplink and reduce delay. For EUL, the users report channel conditions and buffer status to the base station. A scheduler at the base station determines which users are allowed to transmit in a given TTI and at what data rate based on the channel and load conditions. Because the transmissions on the uplink are not orthogonal, the uplink transmissions by each user creates interference for the other users. If the interference level is too high, the base station may not be able to receive some transmissions. On the other hand, if the interference level is too low, the full system capacity will not be exploited.

In order to maintain the interference at acceptable levels, the scheduler at the base station estimates the load at the base station due to its scheduling decisions and tries to maintain the total load below a predetermined threshold. Prediction of the uplink load is difficult because of the inherent delay between the time that scheduling decisions are made and the time that the users transmit on the uplink. In conventional systems that do not employ interference suppression receivers, an estimate of the predicted load is based on measurements of the signal-to-interference ratio (SIR) together with beta factors that define the power offset of a user relative to a power-controlled control channel. This technique is suitable for conventional receivers that do not employ interference suppression.

The introduction of interference suppression receivers in the near future will make the load prediction problem substantially more difficult for several reasons. First, the load appearing over the air interface will be significantly reduced by the interference suppression receivers. As a result, the conventional load measures based on measurements of the SIR will not reflect the load after interference suppression that is applicable to interference suppression receivers. Second, the amount of the load reduction due to interference suppression receivers will vary depending on the number of interfering users in the cell. Third, the amount of the load reduction will vary depending on the data rates of the users transmitting on the uplink.

Accordingly, there remains a need for techniques to predict an "effective load" after interference suppression that is applicable to interference suppression receivers.

SUMMARY

The present invention encompasses methods and apparatus for load prediction in a wireless communication network employing interference suppression receivers. A new load measure having low computational complexity is provided that gives an effective load after interference suppression. The effective load after interference is compared with the air interface load to determine interference suppression gains for different user constellations. The interference suppression gains may be stored in the form of a gain table that gives the expected interference suppression gains for different user constellations. The expected interference suppression gains may be used by a scheduler at a base station to predict the effective load for two or more candidate user constellations, and to select one of the candidate user constellations. Users are then scheduled according to the selected user constellation.

Exemplary embodiments of the invention comprise methods of scheduling uplink transmissions from a plurality of users to a base station in a communication network. In one exemplary method, the base station estimates interference suppression gains for two or more candidate user constellations, and computes predicted loads for a scheduling interval for each of the two or more candidate user constellations as a function of the estimated interference suppression gains. The base station then schedules uplink transmissions from one or more of the users during the scheduling interval based on the predicted loads.

Other embodiments of the invention comprise base stations with interference suppression receivers. In one embodiment, the base station includes an interference suppression receiver to suppress interference in received signals from a plurality of users, and a control circuit to schedule uplink transmissions from the users. The control circuit includes a scheduler configured to estimate interference suppression gains for two or more candidate user constellations, compute predicted loads for a scheduling interval for each of the two or more candidate user constellations as a function of the estimated interference suppression gains for the candidate user constellations, and to schedule uplink transmissions from one or more of the users during the scheduling interval based on the predicted loads.

Embodiments of the present invention provide a more accurate estimate of the predicted loads when interference suppression receivers are used, and enable the base station to operate with lower margins. As a result, more efficient use of the uplink resources is realized.

BRIEF DESCRIPTION OF THE DRAWINGS

FIG. 8 illustrates an exemplary time-division multiplexing scheme.

DETAILED DESCRIPTION

Figure 1:
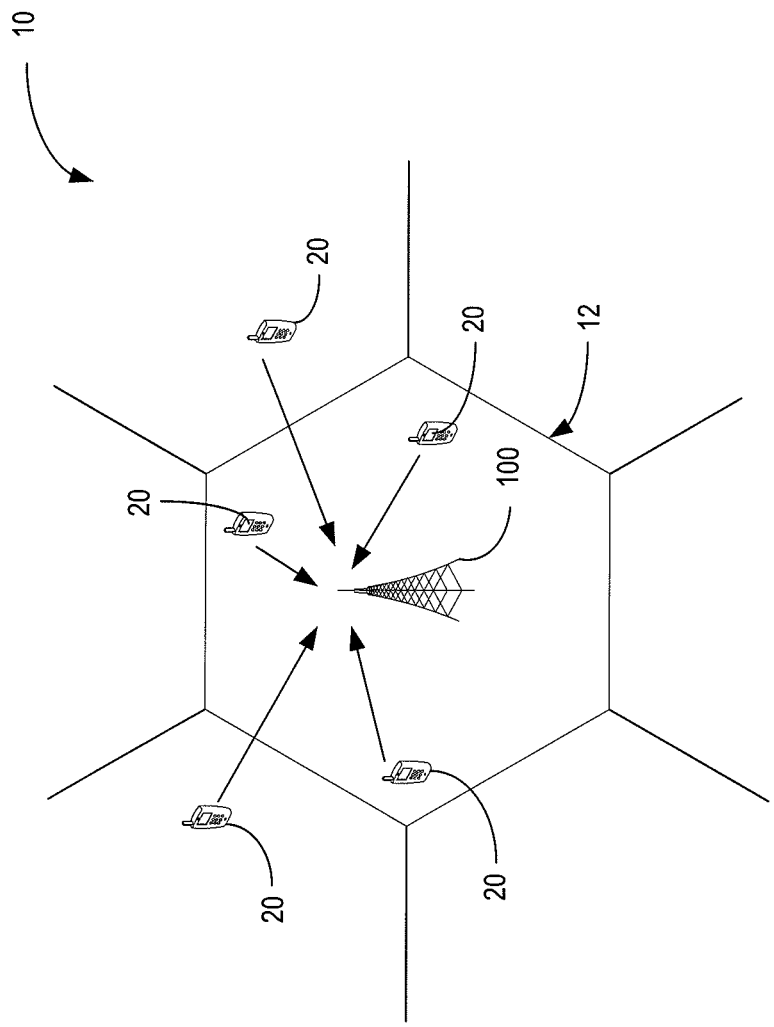
FIG. 1 illustrates an exemplary wireless communication network according to one exemplary embodiment including a base station implementing fast scheduling.

Referring now to the drawings, an exemplary embodiment of the present invention will be described in the context of a Wideband Code Division Multiple Access (WCDMA) system. Those skilled in the art will appreciate, however, that the present invention is more generally applicable to any communication system using fast scheduling on the uplink.

FIG. 1 illustrates a wireless communication network 10 including a base station 100 implementing fast scheduling on the uplink. The base station 100 provides service to a plurality of users 20 within a cell 12 served by the base station 100. The base station 100 receives signals of interest on an uplink (UL) channel from users 20 within the cell 12 served by the base station 20. The base station 100 also receives interfering signals from users 20 in neighboring cells.

In WCDMA systems, fast scheduling is used on the uplink. Fast scheduling allows the base station 100 to adjust the maximum data rate of the users 20 transmitting on the uplink, and to allocate the uplink resources among the users 20 in response to the uplink traffic demands and interference conditions. As a result, the network 10 can be operated close to the maximum load; leading to increased data rates for users 20 and increased uplink capacity.

To support fast scheduling, a load estimator is used to estimate the cell load. The total load is the sum of the load due to users 20 within the cell and to users 20 in neighboring cells. The load estimator estimates the load as seen by the base station 100 and determines the scheduling headroom (i.e., the difference between the maximum allowed load and the estimated load). The scheduling headroom limits the number of users 20 that can simultaneously transmit on the uplink, and also limits the data rates of the users 20. Based on the scheduling headroom, a scheduler 150 (see FIG. 2) at the base station 100 determines how many users 20 to schedule on the uplink, and what data rates to allow for each user 20.

In Code Division Multiple Access Systems (CDMA) systems, the cell load is conventionally estimated in terms of the rise over thermal noise (RoT) in the cell. The RoT for a given time t is defined as:

$$RoT(t) = \frac{P_{RTWP}(t)}{P_N(t)} \qquad (1)$$

where $P_{RTWP}(t)$ is the received total wideband power, and $P_N(t)$ is the thermal noise. The received total wideband power $P_{RTWP}(t)$ is defined as:

$$P_{RTWP}(t) = \sum_{k=i}^{K} P_k(t) + P_{neighbor}(t) + P_N(t) \qquad (2)$$

where $P_k(t)$ is the received power from user k, and $P_{neighbor}(t)$ is the neighbor cell interference.

In order to make efficient use of the uplink resources while avoiding excessive loads, the base station 100 estimates the expected load due to its scheduling decisions, and tries to maintain the total load below a predetermined threshold. The prediction of the uplink load for a candidate set of scheduling grants is based on the power relation:

$$P_{RTWP}(t) - P_N(t) = \sum_{i=1}^{K} L_i(t) P_{RTWP}(t) + P_{neighbor}(t) \qquad (3)$$

where $L_i(t)$ is a load factor for user i. The load factor for user i is given by:

$$L_i(t) = \frac{(C/I)_i(t)}{1 + (1-\alpha)(C/I)_i(t)}, \, i = 1, \dots, I \qquad (4)$$

where the index i indicates the user 20 and $(C/I)_i(t)$ is a code power-to-interference ratio for user i, and $\alpha$ is the self-interference factor. The code power-to-interference ratio is related to the signal-to-interference-plus-noise ratio (SINR) and may be computed according to:

$$(C/I)_i(t) = \qquad (5)$$
$$\frac{SINR_i(t)}{W_i} \frac{RxLoss}{G} \times \left(1 + \frac{\beta_{DPDCH,i}^2(t) + \beta_{EDPCCH,i}^2(t) + n_{codes,i}(t)\beta_{EDPDCH,i}^2(t) + \beta_{HSDPCCH,i}^2(t)}{\beta_{DPCCH}^2(t)}\right)$$

In Equation (5), $W_i$ represents the spreading factor for user i, RxLoss represents missed receiver energy, G represents the diversity gain, and the $\beta$'s represent the beta factors of the respective channels (assuming non-active channels have zero beta factors). To obtain the uplink load, the scheduler 150 computes the load contribution for each user 20 according to Equations (4) and (5) and then sums the individual load contributions according to:

$$L_{own}(t) = \sum_{i=1}^{I} L_i(t) \qquad (6)$$

Inserting Equation (6) into Equation (3) gives the following power relation:

$$P_{RTWP}(t) = L_{own}(t)P_{RTWP}(t) + P_{neighbor}(t) + P_N(t) \qquad (7)$$

Dividing Equation (7) by $P_N(t)$ shows that the RoT can be predicted k TTIs ahead according to:

$$RoT(t+kT) = \frac{P_{neighbor}(t)/P_N(t)}{1 - L_{own}(t)} + \frac{1}{1 - L_{own}(t)} \qquad (8)$$

Prediction of the uplink load is difficult because of the inherent delay between the time that scheduling decisions are made and the time that the users 20 transmit on the uplink. Further, conventional load estimation techniques reflect the load as seen over the air interface. This load is reduced by interference suppression. Hence, conventional load estimates will be higher than the "effective load" after interference suppression. The reduction in the air interface load, referred to herein as the "interference suppression gain," will vary depending on the number of users 20 transmitting on the uplink and the data rates of those users 20.

Exemplary embodiments of the present invention provide estimates and predictions of the effective load after interference suppression. Improved accuracy in load estimation and load prediction allows the system to operate closer to its pole capacity. As a result, data rates for users 20 will increase and uplink capacity will be increased.

Additionally, exemplary embodiments of the invention provide techniques for determining the interference suppression gains for different "user constellations." The term "user constellation" as used herein refers to a configuration of users 20 resulting from a set of scheduling grants. In one exemplary embodiment, a user constellation is defined by the number of users 20 and corresponding data rates. As an example, a first user constellation may comprise three users 20 transmitting at data rates of 960 kbit/s, 640 kbit/s, and 640 kbit/s respectively. A second user constellation may comprise two users 20 both transmitting at data rates of 960 kbit/s.

In some embodiments, a scheduler 150 at a base station 100 provides a set of candidate user constellations to a load estimation circuit 140. The load estimation circuit 140 provides the scheduler 150 with estimates of the predicted air interface load for each of the candidate user constellation (see FIG. 2). The scheduler 150 at the base station 100 computes a predicted "effective load" after interference suppression as a function of the air interface load for each candidate user constellation and the interference suppression gain and selects one of the candidate user constellations.

Figure 2:
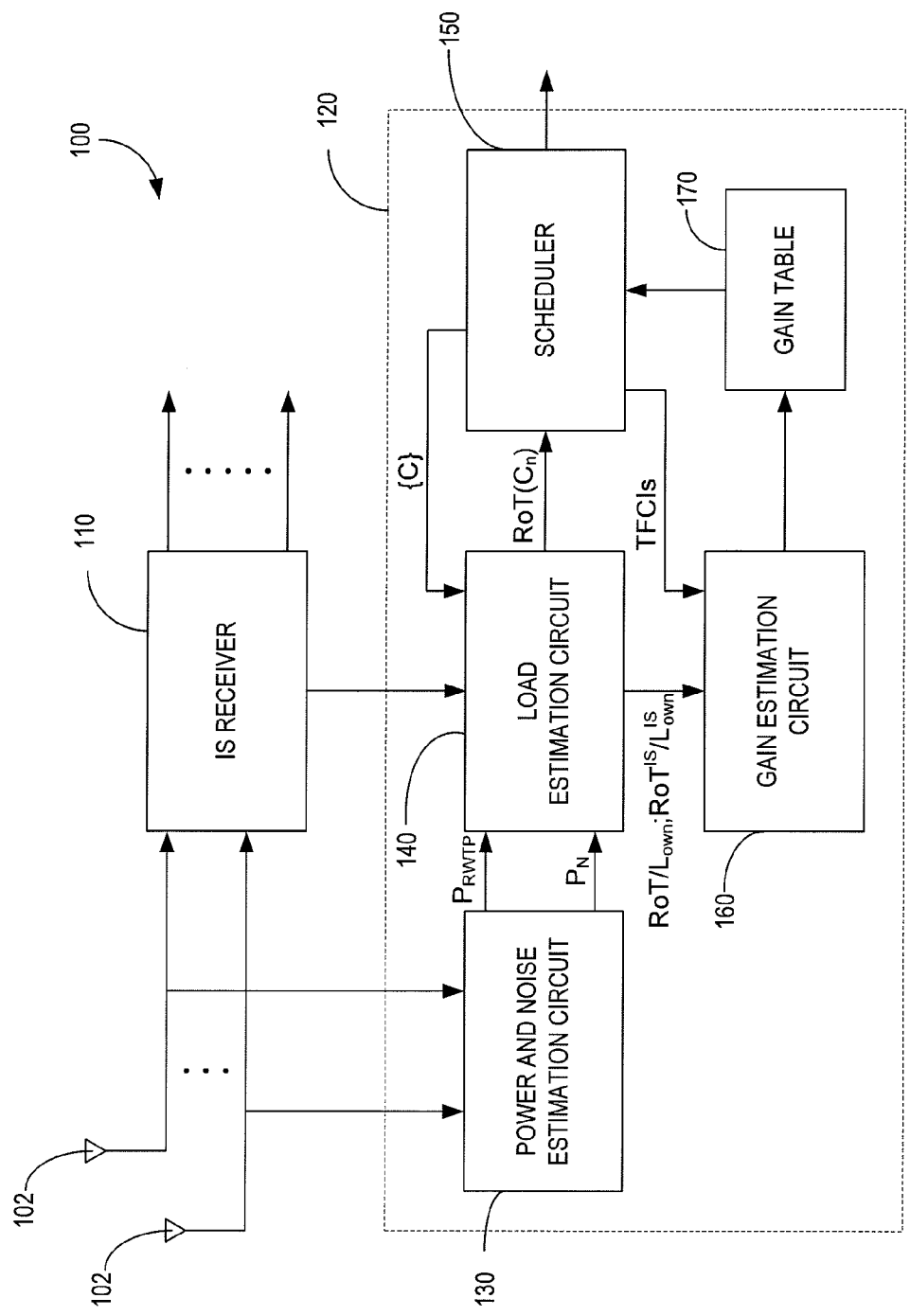
FIG. 2 illustrates the main functional elements of a base station in the wireless communication network implementing power control loop stability monitoring.

FIG. 2 illustrates the main functional components in an exemplary base station 100. The base station 100 comprises an interference suppression (IS) receiver 110 coupled to one or more antennas 102, and a control circuit 120. The signals received by the antennas 102 from the users 20 are input to the interference suppression receiver 110. The interference suppression receiver 110 demodulates the received signals and suppresses interference in the received signals. The demodulated signals with interference suppressed are output to a decoder (not shown). The control circuit 120 is responsible for monitoring the uplink load and scheduling the uplink transmissions from the users 20.

The control circuit 120 includes a power and noise estimation circuit 130, a load estimation circuit 140, a scheduler 150, a gain estimation circuit 160, and a gain table 170 stored in non-volatile memory. The power and noise estimation circuit 130 generate estimates of the total wideband received power $P_{RTWP}$ before interference and thermal noise power $P_N$. The thermal noise power $P_N$ is estimated from the measured $P_{RTWP}$. Exemplary techniques for estimating the thermal noise are described in T. Wigren, "Recursive noise floor estimation in WCDMA", IEEE Trans. Veh. Tech., vol. 59, no. 5, pp. 2615-2620, 2010, which is incorporated herein in its entirety by reference. The total received wideband power and thermal noise power are input to the load estimation circuit 140.

The load estimation circuit 140 predicts loads for a set of candidate user constellations and provides estimates of the predicted loads for each candidate user constellation to the scheduler 150. The load estimation circuit 140 also generates estimates of the actual load before and after interference suppression realized as a result of past scheduling decisions. These estimates may comprise estimates of the RoT before and after interference suppression. Alternatively, these estimates may comprises a cell load factors $L_{own}$, before and after interference suppression. These estimates are input to the gain estimation circuit 160 for computation of the interference suppression gains.

The scheduler 150 schedules the uplink transmissions from the users 20. The scheduler 150 provides a set of candidate user constellations, denoted $\{\{C\}=C_1, \ldots, C_n\}\}$, to the load estimation circuit 140. Each candidate user constellation $C_n$ corresponds to a set of scheduling grants. The load estimation circuit 140, as previously noted, predicts the air interface loads for the candidate user constellations $\{C\}$ and provides the predicted air interface loads to the scheduler 150. In some exemplary embodiments, the scheduler 150 uses the realized interference suppression gains stored in the gain table 170 to adjust the predicted air interface loads to obtain the effective load after interference suppression due to its scheduling decisions. As previously noted, the gain table 170 stores an average interference suppression gain for a plurality of candidate users constellations. For each candidate user constellation $C_n$ in $\{C\}$, the scheduler looks up the corresponding interference suppression gain stored in the gain table 170. Alternatively, for user constellations with no corresponding interference suppression gain in the gain table 170, interference suppression gains may be estimated by interpolation. The scheduler 150 selects a candidate user constellation based on the effective loads computed for each constellation.

The gain estimation circuit 160 computes the interference suppression gain realized by the interference suppression receiver 110 from the load estimates provided by the load estimation circuit 140. The interference suppression gains are a measure of the load reduction due to interference suppression, and are determined for each user constellation as the difference between simultaneous measurements of the air interface load before interference suppression and the effective load after interference suppression. The gain estimation circuit 160 estimates the average interference suppression gains for each user constellation over a plurality of TTIs. The computed interference suppression gains are used to update the gain table 170. Techniques for determining the interference suppression gains are described in greater detail below.

Table 1 below illustrates the structure of an exemplary gain table.

TABLE 1

Structure of Gain Table

| No. of user (A) | Data Rates (B) | IS Gain as fraction of air interface load (C) | Variance (D) |
| --- | --- | --- | --- |
| 3 | 960, 640, 640 | 0.15 | 0.002 |
| 2 | 960, 960 | 0.30 | 0.005 |
| 2 | 1920, 1920 | 0.47 | 0.010 |
| 4 | 480, 480, 480, 480 | 0.06 | 0.001 |
| ... | ... | ... | ... |

The exemplary gain table 170 shown in Table 1, includes fields that specify the number of users 20 in the user constellation (column A), the date rates of the users 20 (column B), the interference suppression gain for the user constellation expressed as a fraction of the air interface load (column C), and the variance of the interference suppression gain (column D).

Figure 3:
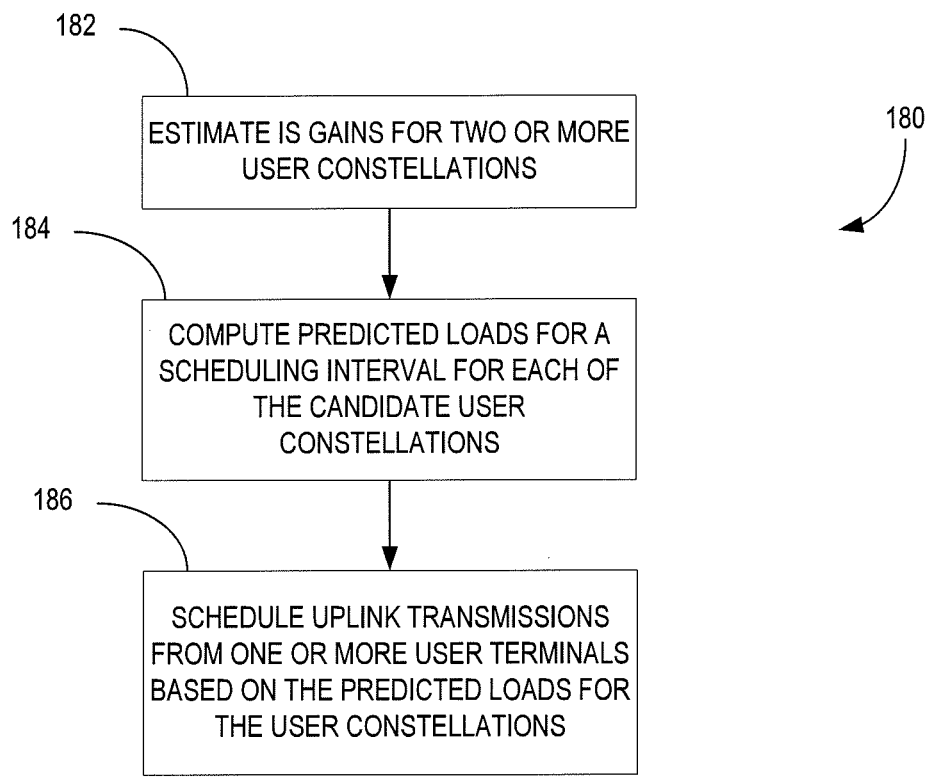
FIG. 3 illustrates an exemplary method of scheduling according to one embodiment.

FIG. 3 illustrates an exemplary method 180 of scheduling uplink transmissions from a plurality of users 20 according to one exemplary embodiment. The scheduler 150 at the base station 100 initially determines the interference suppression gain for two or more candidate user constellations being considered (block 182). It will be appreciated that the scheduler 150 has some flexibility in the number of users 20 that can be simultaneously scheduled on the uplink and the data rates assigned to the users 20. Thus, the scheduling decision involves determining a number of users 20 to be scheduled and what data rates to allow for the users 20. The number of users 20 and corresponding data rates of the users 20 corresponds to a user constellation.

The scheduler 150 computes a predicted load for a scheduling interval for each candidate user constellation as a function of the interference suppression gain for the user constellation (block 184). The predicted load is the effective load after interference suppression. In some embodiments, the scheduler 150 computes an air interface load before interference suppression for each of the candidate user constellations, and adjusts the computed air interface load according to the corresponding interference suppression gain for the user constellation to obtain the predicted load after interference suppression. The air interface load before interference suppression may be computed according to Equations (4)-(6). The load after interference suppression may then be computed according to:

$$L_{own}^{IS} (1-\alpha) L_{own} \qquad (9)$$

where $\alpha$ is the gain factor expressed as a percentage of the air interface load for the user constellation under consideration (see e.g., Table 1).

Based on the predicted loads for the candidate user constellations and the scheduling headroom, the scheduler 150 schedules uplink transmissions from one or more users 20 during the scheduling interval (block 186). In one exemplary embodiment, the scheduler 150 selects one of the candidate user constellations for the scheduling interval based on the predicted loads and the scheduling headroom. The selected user constellation may, for example, comprise the one that is below a load threshold and that maximizes throughput. The scheduler 150 then selects one or more users 20 and assigns data rates according to the selected user constellation.

One aspect of the invention is the estimation of the interference suppression gains for the candidate user constellations. As previously noted, the interference suppressions gains will be different for different user constellations. To build the gain table 170, the load estimation circuit 140 simultaneously measures the actual air interface load before interference suppression and the effective load after interference suppression. The user constellation used in a given TTI is known to the base station 100. Hence, the base station 100 can compute the interference suppression gain for the user constellation in a given TTI as the difference between the actual air interface load before interference suppression and the effective load after interference suppression.

In some embodiments, the calculated loads may be computed as the rise over thermal before and after interference suppression. The rise over thermal before interference suppression is denoted RoT(t). The rise over thermal after interference suppression is denoted $RoT^{IS}(t)$. The interference suppression gain $\Delta RoT$ is then given by:

$$\Delta RoT = RoT(t) - RoT^{IS}(t) \qquad (10)$$

Alternatively, $RoT^{IS}(t)$ and $RoT(t)$ may be converted to corresponding load factors $L_{own}^{IS}(t)$ and $L_{own}(t)$ before computing the interference suppression gain. In this case, the interference suppression gain is denoted $\Delta L_{own}$ and is given by:

$$\Delta L_{own} = L_{own}(t) - L_{own}^{IS}(t) \qquad (11)$$

In order to transform the RoT estimates to corresponding load factors, Equation (8) can be rewritten as:

$$L_{own}(t) = 1 - \frac{P_{neighbor}(t)/P_N(t) + 1}{RoT(t+kT)} \qquad (12)$$

The neighbor cell interference $P_{neighbor}(t)$ can be estimated as described below. In case the functionality for estimation neighbor cell interference is not present, the term $P_{neighbor}(t)/P_N(t)$ can be configured to a preset value at the cost of accuracy.

Methods for computing the load after interference suppression will depend on the type of interference suppression receiver being used. In the following discussion, embodiments of the invention using a GRAKE+ receiver, a Frequency Domain Equalization (FDE) receiver, or a Frequency Domain Pre-Equalization (FDPE) receiver will be discussed. Some embodiments of the invention may use other types of interference suppression receivers 110. Therefore, the discussion herein of specific types of interference suppression receivers should not be construed as limiting.

Figure 4:
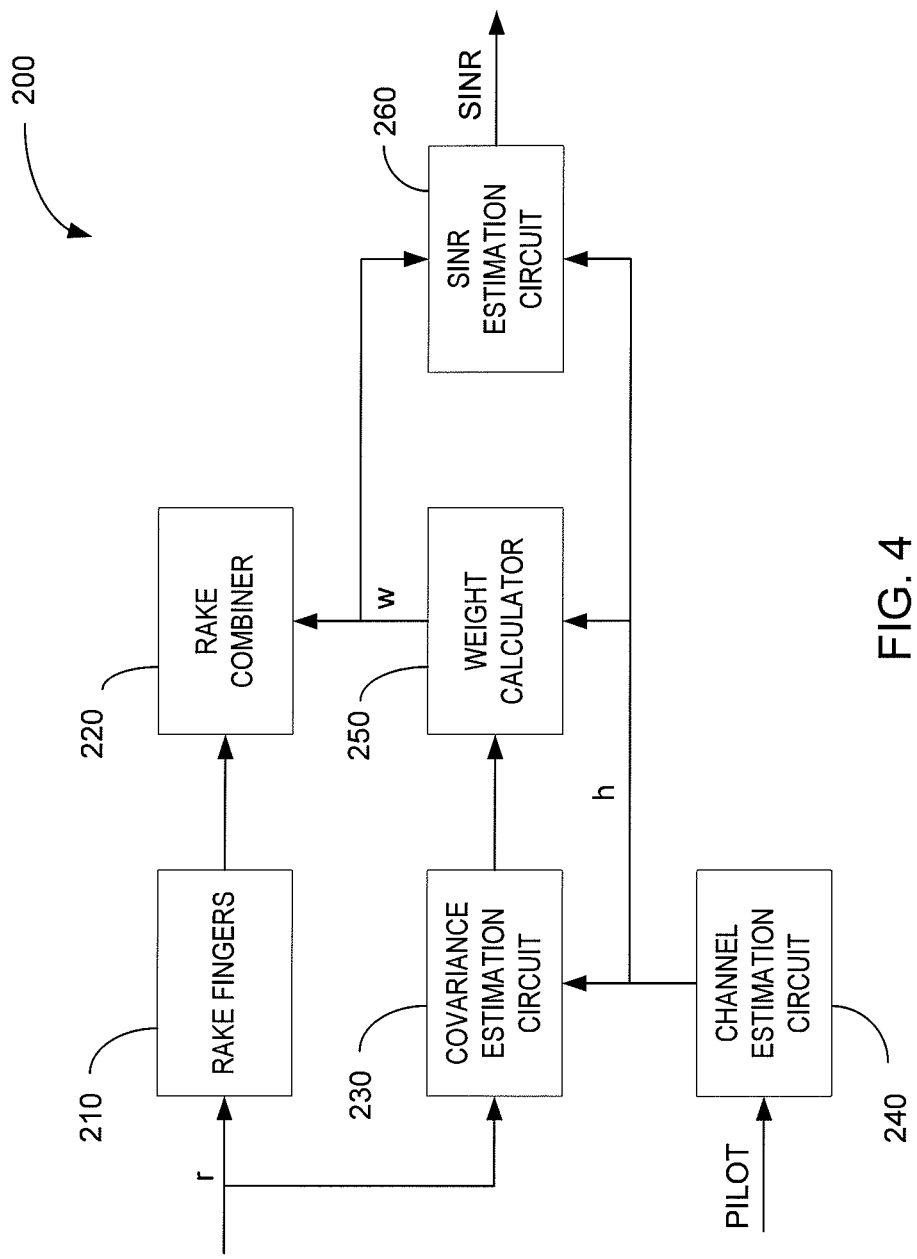
FIG. 4 illustrates an exemplary GRAKE+ receiver used in one embodiment.

FIG. 4 illustrates the main functional components of a GRAKE+ receiver 200 which may be used as an interference suppression receiver 110 in embodiments of the present invention. The GRAKE+ receiver 200 is a type of linear receiver. The GRAKE+ receiver 200 comprises a plurality of RAKE fingers 210 to despread the received signals, and a GRAKE+ combiner 220 to coherently combine the outputs to form symbol estimates. In a conventional RAKE receiver, the object is to collect signal energy by placing fingers on the strongest path delays and combining the despread values from different fingers coherently using weights that correspond to estimates of the channel coefficient. In the case of a GRAKE+ receiver, finger placement and combining weight computation are used to both collect signal energy and to suppress interference.

A covariance estimation circuit 230 estimates the correlations between impairment on different fingers of the GRAKE+ receiver 200 and generates an impairment covariance matrix $\hat{R}_u$. A channel estimation circuit 240 generates an estimate $\hat{h}_u$ of the channel coefficients based on a pilot signal. The impairment covariance matrix $\hat{R}$ and channel estimates $\hat{h}_u$ are input to a weight calculator 250. The weight calculator 250 determines the combining weights $\hat{w}_u$ for the RAKE combiner 210 according to:

$$\hat{w}_u = \hat{R}_u^{-1} \hat{h}_u. \qquad (13)$$

The channel estimates $\hat{h}_u$ and combining weights $\hat{w}_u$ are also input to an SINR estimation circuit 260. The SINR estimation circuit 260 computes an estimate of the SINR according to:

$$SINR^{IS} = \frac{(\hat{w}_u^H \hat{h}_u)^2}{\hat{w}_u^H \hat{R}_u \hat{w}_u}. \qquad (14)$$

The effect of the covariance matrix is to effectively whiten the correlated interference and remove large spectral peaks from interferers at certain finger locations and for certain antenna elements.

A chip equalizer receiver is a related type of interference suppression receiver for WCDMA, which is also linear. The difference between GRAKE+ receiver 200 and the chip equalizer receiver is the order of certain basic operations. Thus, some embodiments of the present invention may use a chip equalizer receiver.

In the case of the GRAKE+ receiver 200, the effective load experienced by each user 20 after interference suppression is individual. Therefore, an individual rise over thermal, $RoT_u^{G+}$ is computed for each user 20 according to:

$$RoT_u^{G+} \equiv \frac{S_u^{G+}}{\kappa_u^{G+}\hat{N}}\left(1 + \frac{SF_{u,EDPCCH}}{\beta_{u,effective}^2}\frac{1}{SINR_u^{G+}}\right) = \frac{S_u^{G+} + I_u^{G+} + \kappa_u^{G+}\hat{N}}{\kappa_u^{G+}\hat{N}}, \quad (15)$$

$$u = 1, \ldots, U$$

The quantities appearing in Equation (15) are all defined in Annex A. It should be noted that all estimates are obtained at the power control slot rate, i.e. 1500 Hz. This makes the estimates useful for stability monitoring of the inner power control loop in WCDMA. The $RoT^{G+}$ relevant for estimation of the interference suppression gain is the maximum of the individual noise rise estimates $RoT_u^{G+}$. The load relevant for estimation of the interference suppression gain is given by:

$$RoT^{tS} = \max(RoT_u^{G+}) \quad (16)$$

Figure 5:
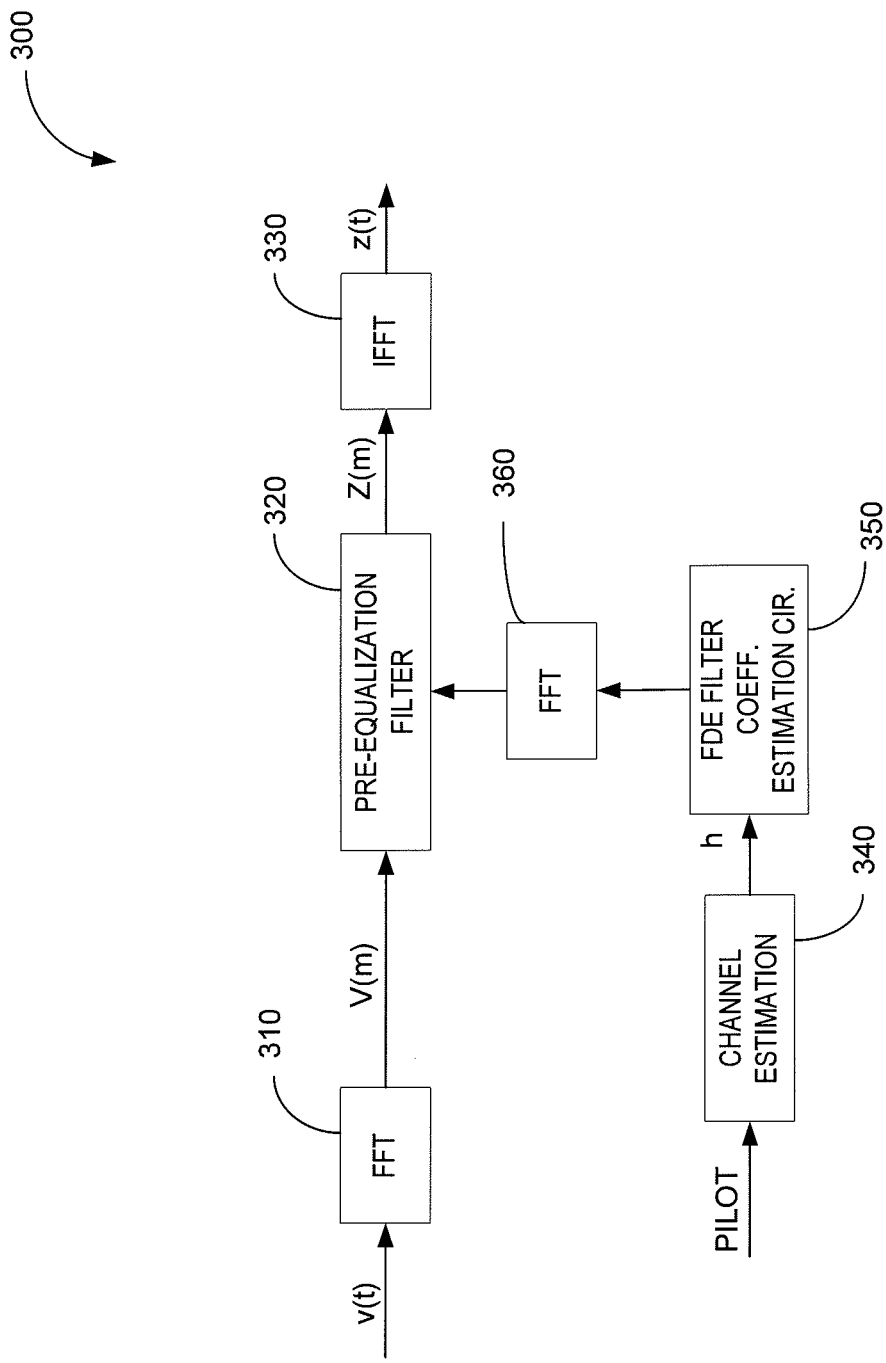
FIG. 5 illustrates an exemplary Frequency Domain Equalization receiver used in one embodiment.

FIG. 5 illustrates a FDE receiver 300, which may be used as an interference suppression receiver 110 in some embodiments. The FDE receiver 300 performs equalization and interference suppression in the frequency domain. To explain the operation of the FDE receiver 300, the following time domain signal model can be used.

$$v_u(t) = \sum_{l=0}^{L-1} h_u(l)z(t-l) + i(t) + n(t), \ldots u = 1, \ldots, U \quad (17)$$

where u denotes the user, $v_u$ is the received signal vector (vector due to multiple antennas), $h_u$ is the radio channel net response, z is the desired (transmitted) signal, i(t) is the interference, and n(t) denotes thermal noise.

The received signal is input to a Fast Fourier Transform (FFT) circuit 310. The FFT circuit 310 converts the received signal from the time domain to the frequency domain. The frequency domain signal is given by:

$$V_u(m) = H_u(m)Z_u(m) + I(m) + N(m), \ldots u=1, \ldots, U \quad (18)$$

where the quantities are the discrete Fourier transforms of the corresponding quantities in Equation (17).

In the FDE receiver 300, minimum mean-square error (MMSE) equalization is performed on $V_u(m)$ in the frequency domain by the frequency domain equalizer circuit 320. The frequency domain signal $V_u(m)$ is applied to the frequency domain equalizer circuit 320. The frequency domain equalizer circuit 320 multiplies the vector of the received signal $V_u(m)$ by a filter coefficient matrix $W_u(m)$ to obtain an estimate $Z_u$ of the desired (transmitted signal). The desired signal $Z_u$ is given by:

$$Z_{FDE,u}(m) = W_u(m)V_u(m) \quad (19)$$

The equalized signal $Z_u$ is then input to an Inverse Fast Fourier Transform (IFFT) circuit 330. The IFFT circuit 330 transforms the desired signal $Z_u$ from the frequency domain to the time domain to obtain a time domain estimate z(t).

Figure 6:
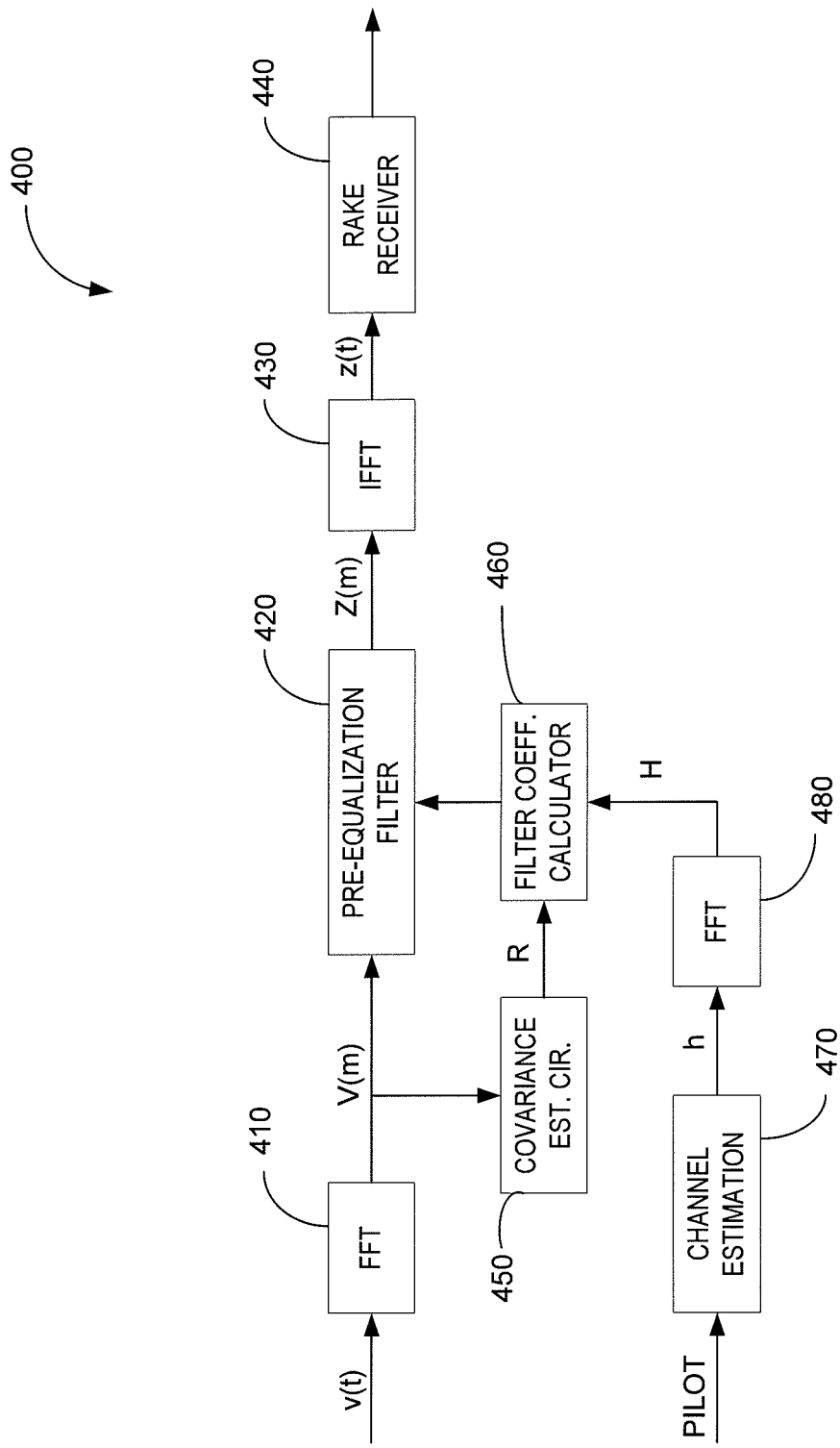
FIG. 6 illustrates an exemplary Frequency Domain Pre-Equalization receiver used in one embodiment.

For the purpose of computing the filter coefficient matrix, the channel is estimated in the time domain by a channel estimation circuit 340 using the pilot signal as illustrated in FIG. 6. In one embodiment, the MMSE filter coefficients may be computed in the time domain by a filter coefficient estimation circuit 350 and transformed to the frequency domain by the FFT circuit 360. Methods of computing the MMSE filter coefficients in the time domain are described in E. Dahlman, S. Parkvall, J. Sköld and P. Beming, "3G Evolution—HSPA and LTE for mobile broadband" 2:nd edition, Academic Press, 2008 (Section 5.1). Rather than computing the filter coefficients in the time domain and then transforming them to the frequency domain, the MMSE filter coefficients can be directly according to:

$$W_n(m) = H_u^H(m)(H_u(m)H_u^H(m) + I(m)I^H(m) + (N(m))^H N(m))^{-1}, \ldots u=1, \ldots, U \quad (20)$$

The computation of the MMSE filter coefficients in the frequency domain is less computationally complex that the equivalent computations in the time domain.

In the case of the FDE receiver 200, the time domain estimate of the desired signal is used to compute the rise-over-thermal $RoT_u^{FDE}$ for each user 20. For the FDE receiver 200, the load for individual users 20 is given by:

$$RoT_u^{FDE} = \frac{z_{FDE,u}^H(t)z_{FDE,u}(t)}{\left(\sum_{l=0}^{L-1} w_u^H(l)w_u(l)\right)\left(\sum_{a=1}^{A} \hat{N}_a^{thermal}\right)} \quad (21)$$

The quantities in Equation (21) are defined in Annex C. These quantities are estimated at the power control slot rate, e.g. 1500 Hz. The load after interference suppression that is relevant for estimation of the interference suppression gain is the maximum noise rise for any user 20 and is given by:

$$RoT^{tS} = \max(RoT_u^{FDE}) \quad (22)$$

FIG. 6 illustrates an exemplary FDPE receiver 400, which may be used as an interference suppression receiver 110 in some embodiments. The FDPE receiver 400 performs interference whitening in the frequency domain. The time domain signal can be modeled as:

$$v(t) = \sum_{l=0}^{L} h(l)z(t-l) + n_v(t) \quad (23)$$

where v is the received signal vector at chip sampling rate, h is the net channel response, z is the transmitted signal, and $n_v$ is the thermal noise and interference. The received signal vector v is input to a Fast Fourier Transform (FFT) circuit 410. The FFT circuit 410 translates the received signal vector into the frequency domain. The received signal vector in the frequency domain is modeled as:

$$V(m) = H(m)Z(m) + N(m) \quad (24)$$

The terms in Equation (24) are the discrete Fourier transforms of the corresponding terms in Equation (23). A pre-equalization filter 420 whitens the received signal vector V(m) in the frequency domain. The desired signal in the frequency domain, denoted $Z_{pre}(m)$, is given by:

$$Z_{pre}(m) = W_{pre}(m)V(m) \quad (25)$$

where $W_{pre}(M)$ is a matrix of the pre-equalization filter coefficients. The pre-qualized signal $Z_{pre}(m)$ is then transformed by the Inverse Fast Fourier Transform (IFFT) 430 to the time domain. The estimate of the transmitted signal in the time domain is denoted $z_{pre}(t)$. The time domain signal is input to a conventional RAKE receiver 440.

In one exemplary embodiment, the equalization filter 420 comprises a MMSE filter given by:

$$W_{pre}(M) = (r_D(M))^{-1} \hat{H}(m) = \quad (26)$$

$$\left( \begin{bmatrix} R_{0,0}(m) & R_{0,1}(m) & \cdots & R_{0,N_r-1}(m) \\ R_{1,0}(m) & R_{1,1}(m) & & \\ \vdots & & \ddots & \\ R_{N_r-1,0}(m) & & & R_{N_r-1,N_r-1}(m) \end{bmatrix} \right)^{-1} \begin{bmatrix} \hat{H}_0(m) \\ \hat{H}_1(m) \\ \vdots \\ \hat{H}_{N_r-1}(m) \end{bmatrix}$$

where $\hat{R}_d(m)$ is an estimate of the covariance matrix of V(m). A covariance estimation circuit 450 computes the covariance matrix $\hat{R}_d(m)$. In one exemplary embodiment, the covariance matrix is computed according to Equation (27) below, averaged over N different data blocks.

$$\hat{R}_d(m) = \frac{1}{N} \sum_{k=0}^{N-1} V_k(m) V_k^H(m) \quad (27)$$

Using Cholesky decomposition, the covariance matrix between the antenna elements can be factored as:

$$L(m) \cdot L^H(m) = R_d(m) \quad (28)$$

The idea behind FDPE is to exploit the factorization and model the filter weights as:

$$W_{MMSE}(m) = (L^H(m))^{-1}((L(m))^{-1}\hat{H}(m)) = W_{pre}(m)((L(m))^{-1}\hat{H}(m)) \quad (29)$$

so that the transmitted signal in the frequency domain becomes MMSE pre-equalized in the frequency domain.

For the purpose of computing the filter coefficient matrix $\hat{R}_d(m)$, the channel is estimated in the time domain by a channel estimation circuit 470 as illustrated in FIG. 6. The time domain channel estimates are then transformed to the frequency domain by the FFT 480. The frequency domain channel estimates and the covariance matrix $\hat{R}_d(m)$ provided by the covariance estimation circuit 470 are input to a filter coefficient calculator 460, which computes the filter coefficients for the pre-equalization filter 420.

Where a FDPE receiver 400 is used as the interference suppression receiver 110, the load relevant for an individual user is given by:

$$RoT^{FDPE} = \frac{z_{pre}^H(t) z_{pre}(t)}{\left( \sum_{l=0}^{L-1} w_{pre}^H(l) w_{pre}(l) \right) \left( \sum_{a=1}^{A} \hat{N}_a^{thermal} \right)} \quad (30)$$

The quantities in Equation (30) are explained in Appendix B. The quantities in Equation (30) are estimated at the power control slot rate. The load after interference suppression that is relevant for estimation of the interference suppression gain is given by:

$$RoT^{IS} = \max(RoT^{FDPE}) \quad (31)$$

In some embodiments, the neighbor cell interference can be subtracted from the $RoT^{IS}$ to obtain a noise rise, denoted $NR^{IS}$, that is more relevant for cell stability. As an example, when the interference suppression receiver 110 comprises of a GRAKE+ receiver, the noise rise may be denoted $NR^{G+}$ and is given for an individual user by:

$$NR_u^{G+} \equiv \frac{S_u^{G+} + I_u^{G+} + \kappa_u^{G+} \hat{N} - I_{u,neighbor}^{G+}}{\kappa_u^{G+} \hat{N}} \quad (32)$$

Equation (32) is derived by subtracting the estimate of neighbor cell interference, denoted by $I_{u,neighbor}^{G+}$, from the numerator in Equation (15).

In order to derive an estimate of the neighbor cell interference after GRAKE+ processing ($I_{u,neighbor}^{G+}$) two simplifying assumptions are made. First, it is assumed that the own cell interference dominates over the neighbor cell interference. Second, it is assumed that the neighbor cell interference can be treated as the product of a white noise process.

Using these simplifying assumptions, the neighbor cell interference can be treated as the thermal noise power floor and is given by:

$$\begin{aligned}
\hat{I}_{u,neighbor}^{G+} &= \frac{1}{M} \sum_{m=1}^{M} \sum_{k=1}^{K} (\hat{w}_u^H I_{u,neighbor,k}^m)^H \hat{w}_u^H I_{u,neighbor,k}^m \\
&= \frac{1}{M} \sum_{m=1}^{M} \sum_{k=1}^{K} tr((\hat{w}_u^H I_{u,neighbor,k}^m)^H \hat{w}_u^H I_{u,neighbor,k}^m) \\
&= \frac{1}{M} \sum_{m=1}^{M} \sum_{k=1}^{K} tr(\hat{w}_u^H I_{u,neighbor,k}^m (\hat{w}_u^H I_{u,neighbor,k}^m)^H) \\
&= \frac{1}{M} \sum_{m=1}^{M} \sum_{k=1}^{K} tr(\hat{w}_u^H I_{u,neighbor,k}^m (I_{u,neighbor,k}^m)^H \hat{w}_u) \\
&= tr\left( \sum_{k=1}^{K} \hat{w}_u^H \left( \frac{1}{M} \sum_{m=1}^{M} I_{u,neighbor,k}^m (I_{u,neighbor,k}^m)^H \right) \hat{w}_u \right) \xrightarrow{M \to \infty} \\
&\quad tr(\hat{w}_u^H E[I_{u,neighbor}(I_{u,neighbor})^H] \hat{w}_u) \\
&= tr(\hat{w}_u^H (\hat{I}_{u,neighbor}) I \hat{w}_u) \\
&= \hat{w}_u^H \hat{w}_u \hat{I}_{u,neighbor}.
\end{aligned} \quad (33)$$

Equation (33) can be rewritten as:

$$I_{u,neighbor}^{G+} = \kappa_u^{G+} \hat{I}_{u,neighbor}, u=1, \ldots, U, \quad (34)$$

where $\hat{I}_{u,neighbor}$ is the neighbor cell interference power as estimated before GRAKE+ processing (i.e., at the same signal point as where $\hat{N}$ is estimated, and $\kappa_u^{G+}$ is a scaling factor). Thus, the neighbor cell interference after interference suppression processing can be obtained by estimating neighbor cell interference before interference suppression processing and applying a scaling factor $\kappa_u^{G+}$. It should be noted that the neighbor cell interference is normally lower than the own cell interference. Therefore the simplifying assumptions used to compute the neighbor cell interference should have little impact on the final result.

Because the neighbor cell interference is independent of the user, combining Equations (32) and (34) results in:

$$\begin{aligned}
NR_u^{G+} &\equiv \frac{S_u^{G+} + I_u^{G+} + \kappa_u^{G+} \hat{N} - I_{u,neighbor}^{G+}}{\kappa_u^{G+} \hat{N}} \\
&= \frac{S_u^{G+}}{\kappa_u^{G+} \hat{N}} \left( 1 + \frac{SF_{u,EDPCCH}}{\beta_{u,effective}^2} \frac{1}{SINR_u^{G+}} \right) - \frac{\hat{I}_{u,neighbor}}{\hat{N}}
\end{aligned} \quad (35)$$

-continued $$= \frac{S_u^{G+}}{\kappa_u^{G+} \hat{N}} \left(1 + \frac{SF_{u,EDPCCH}}{\beta_{u,effective}^2} \frac{1}{SINR_u^{G+}}\right) - \frac{\hat{I}_{neighbor}}{\hat{N}}$$

One method of estimating the neighbor cell interference is described in U.S. patent application Ser. No. 13/376,524 filed on Dec. 6, 2011. To briefly summarize, this application discloses use of a Kalman filter to estimate the sum of neighbor cell interference and thermal noise. The thermal noise can be subtracted from this estimate to obtain an estimate of neighbor cell interference. This application is incorporated herein in its entirety by reference.

Referring again to FIG. 2, in order to make the interference suppression gains available to the scheduler 150, the gain table 170 is built and stored in memory. In one exemplary embodiment, the gain table 170 is constructed so that the factors that have the greatest impact are used to index the gain table 170. In the exemplary embodiment shown in Table 1, the factors used for indexing are the number of users 20 in a user constellation, and the data rates of the users 20.

In order to reduce the size of the gain table 170, the number of users 20 can be divided into the number of high data rate users above a bit rate threshold, and the number of low data rate users 20 below the bit rate threshold. Similarly, the granted bit rates can be divided into the granted bit rates of the high data rate users 20 and the total granted bit rate to all of the low rate users 20. As discussed above, the number of users 20 and their bit rates is referred to herein as the "user constellation."

In order to adapt the table, each entry in the gain table 170 is updated with at least a sliding average of the selected interference suppression gain, in either the RoT or load factor domain. In addition, the variance can be estimated. The following four recursive equations are used for updating the gain table:

$$\langle \Delta RoT^{IS} \rangle (t+T) = \alpha_1 \langle \Delta RoT^{IS} \rangle (t) + (1-\alpha_1) \Delta RoT^{IS}(t) \quad (36)$$

$$\langle (\Delta RoT^{IS})^2 \rangle (t+T) = \alpha_2 \langle (\Delta RoT^{IS})^2 \rangle (t) + (1-\alpha_2)(\Delta RoT^{IS}(t) - \langle \Delta RoT^{IS} \rangle (t)) \quad (37)$$

$$\langle \Delta L_{own}^{IS} \rangle (t+T) = \alpha_3 \langle \Delta L_{own}^{IS} \rangle (t) + (1-\alpha_3) \Delta L_{own}^{IS}(t) \quad (38)$$

$$\langle (\Delta L_{own}^{IS})^2 \rangle (t+T) = \alpha_4 \langle (\Delta L_{own}^{IS})^2 \rangle (t) + (1-\alpha_4)(\Delta L_{own}^{IS}(t) - \langle \Delta L_{own}^{IS} \rangle (t)) \quad (39)$$

In Equations (36)-(39), the symbol $\langle \ \rangle$ indicates average.

In some embodiments, it may be advantageous to express the interference suppression gain as a fraction of the total load, at the air interface or after interference suppression processing. This embodiment is illustrated in Table 1.

Normalization of the air interface loads before interference suppression requires that the following averages be computed:

$$\langle RoT \rangle (t+T) = \alpha_1 \langle RoT \rangle (t) + (1-\alpha_1) RoT(t) \quad (40)$$

$$\langle (RoT)^2 \rangle (t+T) = \alpha_2 \langle (RoT)^2 \rangle (t) + (1-\alpha_2)(RoT(t) - \langle RoT \rangle (t)) \quad (41)$$

$$\langle L_{own} \rangle (t+T) = \alpha_3 \langle L_{own} \rangle (t) + (1-\alpha_3) L_{own}(t) \quad (42)$$

$$\langle (L_{own})^2 \rangle (t+T) = \alpha_4 \langle (L_{own})^2 \rangle (t) + (1-\alpha_4)(L_{own}(t) - \langle L_{own} \rangle (t)) \quad (43)$$

Similarly, normalization of the effective loads after interference suppression requires that the following averages be computed:

$$\langle RoT^{IS} \rangle (t+T) = \alpha_1 \langle RoT^{IS} \rangle (t) + (1-\alpha_1) RoT^{IS}(t) \quad (44)$$

$$\langle (RoT^{IS})^2 \rangle (t+T) = \alpha_2 \langle (RoT^{IS})^2 \rangle (t) + (1-\alpha_2)(RoT^{IS}(t) - \langle (RoT^{IS}) \rangle (t)) \quad (45)$$

$$\langle L_{own}^{IS} \rangle (t+T) = \alpha_3 \langle L_{own}^{IS} \rangle (t) + (1-\alpha_3) L_{own}^{IS}(t) \quad (46)$$

$$\langle (L_{own}^{IS})^2 \rangle (t+T) = \alpha_4 \langle (L_{own}^{IS})^2 \rangle (t) + (1-\alpha_4)(L_{own}^{IS}(t) - \langle L_{own}^{IS} \rangle (t)) \quad (47)$$

Figure 7:
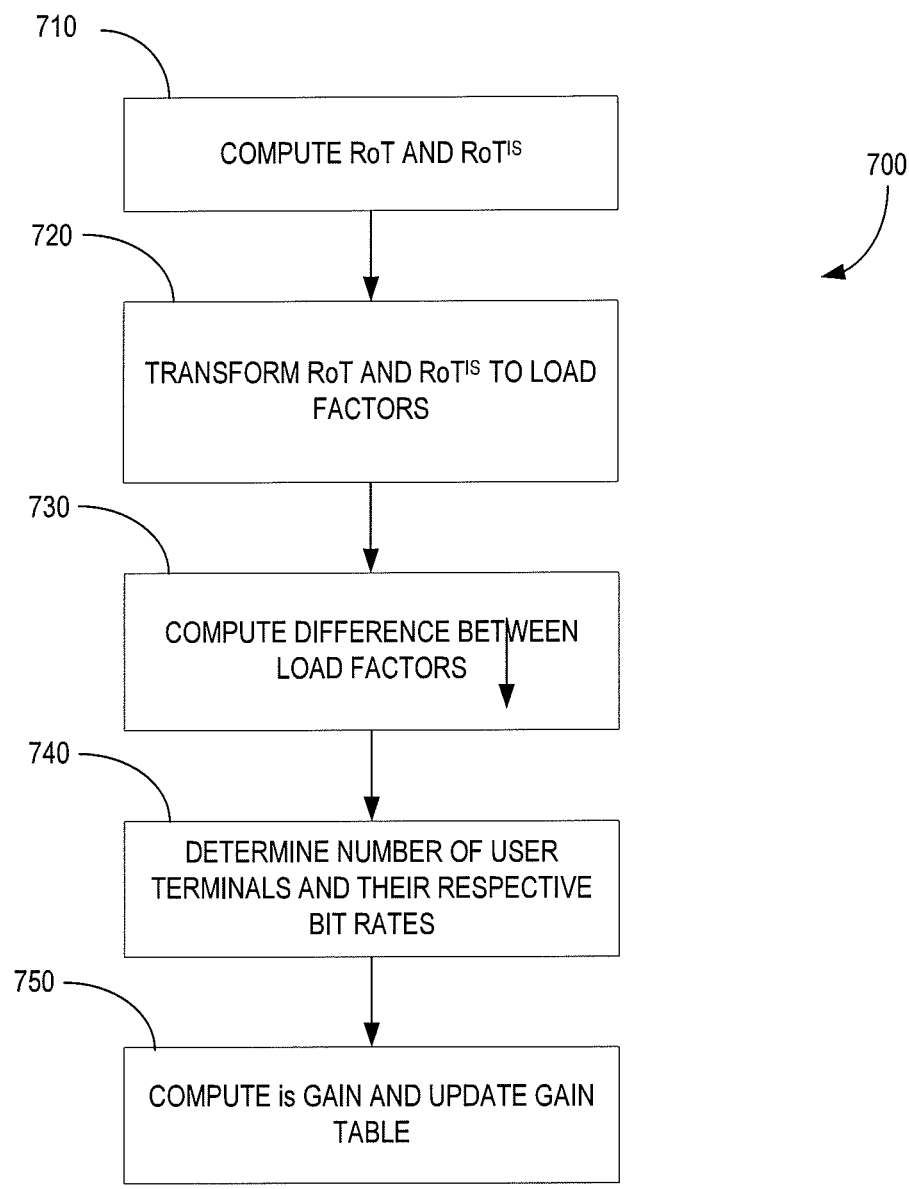
FIG. 7 illustrates an exemplary method of updating a gain table storing average interference suppression gains.

FIG. 7 illustrates an exemplary procedure 700 for updating the gain table 170. To begin, the RoT and RoT$^{IS}$ for a TTI are computed (block 710). The computation of RoT and RoT$^{IS}$ may be performed for a subset of the users 20 that account for the majority of the load. The RoT and RoT$^{IS}$ estimates are then transformed to corresponding load factors $L_{own}$ and $L_{own}^{IS}$ using Equation (12) (block 720). The transformation of RoT and RoT$^{IS}$ to load factors $L_{own}$ and $L_{own}^{IS}$ avoids the need to estimate neighbor cell interference. The estimation of RoT and RoT$^{IS}$ and transformation to load factors may, in some embodiments, be performed by the load estimation circuit 140. The load factors $L_{own}$ and $L_{own}^{IS}$ are then supplied to the gain estimation circuit 160. Alternatively, the load estimation circuit 140 may provide RoT and RoT$^{IS}$ to the gain estimation circuit 160, which then transforms RoT and RoT$^{IS}$ to load factors $L_{own}$ and $L_{own}^{IS}$.

Once the load factors $L_{own}$ and $L_{own}^{IS}$ are obtained, gain estimation circuit 160 computes a difference of the load factors $L_{own}$ and $L_{own}^{IS}$ (block 730). This difference represents the interference suppression gain, i.e. the reduction in the air interference load due to interference suppression. The gain estimation circuit 160 determines the number of users 20 and their bit rates, i.e. the user constellation (block 740). The user constellation may be determined from the TFCI and E-TFCI, which is provided by the scheduler 150. The gain estimation circuit 160 then computes the updated interference suppression gain according to Equation (38) and (39) and updates the gain table 170 (block 750).

In some embodiments, the load prediction and scheduling techniques can be applied to time-division multiplexing (TDM) schemes. As an example, WCDMA systems typically employ up to 8 hybrid automatic repeated request (HARQ) processes. Each data transmission is assigned to one of the eight HARQ processes. The data received within each HARQ process are processed in parallel. In certain embodiments, TDM can be implemented by using scheduling grants that are valid for specified HARQ processes. FIG. 8 illustrates the concept of HARQ-specific grants. In FIG. 8, a first set of scheduling grants valid for HARQ processes 0-2 are granted to a first set of users 20, and a second set of scheduling grants valid for HARQ processes are granted to a second set of users 20.

When TDM is used, the RoT, RoT$^{IS}$, $L_{own}$, and $L_{own}^{IS}$ is determined separately for each HARQ process. Neighbor cell interference and noise may be computed once for all processes. The interference suppression gains for all HARQ processes can be stored in a single table. Equations (36)-(39)

are executed once for each process in order to update the gain table. Table 2 below shows the structure of the gain table 170 for storing interference suppression gains for multiple HARQ processes.

TABLE 2

Structure of Gain Table For Multiple HARQ Processes

| HARQ # | No. of users | Data Rates | IS Gain as fraction of air interface load | Variance |
|---|---|---|---|---|
| 1 | 3 | 960, 640, 640 | 0.15 | 0.002 |
|   | 2 | 960, 960 | 0.30 | 0.005 |
| ... | ... | ... | ... | ... |
| 2 | 2 | 1920, 1920 | 0.47 | 0.010 |
|   | 4 | 480, 480, 480, 480 | 0.06 | 0.001 |
| ... | ... | ... | ... | ... |
| 8 | 2 | 960, 960 | 0.37 | .004 |
| ... | ... | ... | ... | ... |
| 8 | 1 | 1920 | 0.21 | .002 |

The scheduling and load estimation techniques herein described may be applied in situations with different carriers and multi-carriers in one band. In such situations, a separate instance of the load prediction and scheduling may be used for each carrier.

The present invention provides a more accurate estimate of the effective load for interference suppression receivers, which may be used for scheduling users 20 on the uplink. The accurate estimation of the uplink load makes it possible to control the uplink load and operate closer to the pole capacity. As a result, the users will see an increase in data rates and uplink capacity will be increased.

1 Annex A—G-rake+ RoT
1.1 Measurement of Load after IS in G-Rake+ and Chip Equalizers To see how load can be estimated taking account of the G-rake+ IS gain, the powers after weight combining are studied at sufficient statistics level. First, it is assumed that the received signal of user u on code $k \in \Omega_u$ is $$y_{u,k} = h_u s_{u,k} + I_{u,k} + N_{u,k}, u=1, \ldots, U, k=1, \ldots, K \quad (A1)$$

where $\Omega_u$ denotes the set of codes for user u, $s_{u,k}$, u=1, ..., U, k=1, ..., K, is the signal, $I_{u,k}$, u=1, ..., U, k=1, ..., K, is the interference and $N_{u,k}$, u=1, ..., U, k=1, ..., K, is the (thermal) noise signal (not power) and $\hat{h}_u$, u=1, ..., U, is the net channel response of user u. G-rake+ then performs weight combining to get the sufficient statistics $z_{u,k}^{G+}$ according to the equations $$\hat{z}_{u,k}^{G+} = \hat{w}_u^H y_{u,k} = \hat{w}_u^H \hat{h}_u s_{u,k} + \hat{w}_u^H I_{u,k} + \hat{w}_u^H N_{u,k}, u=1, \ldots, U, k=1, \ldots, K \quad (A2)$$

$$\hat{R}_u \hat{w}_u = \hat{h}_u, u=1, \ldots, U \quad (A3)$$

Here $\hat{w}_u$ are the combining weights of G-rake+, whereas the estimated covariance matrix that models the interference for computation of the combining weights for the users u is given by $\hat{R}_u$. Equations (A2) and (A3) have two main implications; one indicating how power measurements can be done and one indicating the scale factor problem which is addressed below.

Using equation (A2) it can be seen that the effect of the G-rake+ weight combining is the same as if an artificial received signal $z_{u,k}^{G+}$ would be processed. Since these signals obviously reflect the weight combining and thereby the IS gains of the G-rake+ receiver, $z_{u,k}^{G+}$, u=1, ..., U, k=1, ..., K, is believed to be a relevant starting point for load estimation.

As stated above, the load estimator operates by processing of the RTWP and in the future possibly the RSEPS. For this reason, similar power signals need to be formed from the $z_{u,k}^{G+}$, u=1, ..., U, k=1, ..., K, in order to reuse the load concept applied without IS.

1.2 User Powers Associated with the G-Rake+ Sufficient Statistics

Squaring (A2) and assuming a low degree of correlation between its three terms, leads to $$|\hat{z}_{u,k}^{G+}|^2 \approx \hat{w}_u^H \hat{h}_u \hat{h}_u^H \hat{w}_u |s_{u,k}|^2 + \hat{w}_u^H I_{u,k} I_{u,k}^H \hat{w}_u + \hat{w}_u^H N_{u,k} N_{u,k}^H \hat{w}_u = S_{u,k}^{G+} + I_{u,k}^{G+} + N_{u,k}^{G+}, u=1, \ldots, U, k=1, \ldots, K. \quad (A4)$$

The rise over thermal, as seen by user u is now, by definition $$RoT_u^{G+} \equiv \frac{S_u^{G+} + I_u^{G+} + N_u^{G+}}{N_u^{G+}} \quad (A5)$$

$$S_u^{G+} = \sum_{k \in \Omega_u} S_{u,k}^{G+} \quad (A6)$$

$$I_u^{G+} = \sum_k I_{u,k}^{G+} \quad (A7)$$

$$N_u^{G+} = \sum_k N_{u,k}^{G+}. \quad (A8)$$

Note that it is unclear how to distinguish between $S_{u,k}^{G+}$, $I_{u,k}^{G+}$ and $N_{u,k}^{G+}$ for $k \in \chi_u$. The algorithm disclosed here avoids many of these problems, since both $I_{u,k}^{G+}$ and $N_{u,k}^{G+}$ are computed from other quantities. Note further that in (A4) $S_{u,k}^{G+} = \hat{w}_u^H \hat{h}_u \hat{h}_u^H \hat{w}_u |s_{u,k}|^2$, i.e. the power is expressed starting with the (transmitted) code power $|s_{u,k}|^2$. The same quantity $S_{u,k}^{G+}$ can also be expressed starting with the antenna power $|e^{u,k}|^2 = \hat{h}_u^H \hat{h}_u |s_{u,k}|^2$, in which case $S_{u,k}^{G+} = \hat{w}_u^H \hat{w}_u |e_{u,k}|^2$. This latter setting is used in the link simulations used for validation of the concept. The algorithmic development that follows does however use the definitions (A4)-(A8).

1.3 Computation of $S_u^{G+}$

The signal power is computed directly from (A6). Using (A4) and (A6) then results in $$S_u^{G+} = \sum_{k \in \Omega_u} S_{u,k}^{G+} = \quad (A9)$$

$$\hat{w}_u^H \hat{h}_u \hat{h}_u^H \hat{w}_u \sum_{k \in \Omega_u} |s_{u,k}|^2 = \hat{w}_u^H \hat{h}_u \hat{h}_u^H \hat{w}_u \hat{E}_{s,u} = |\hat{w}_u^H \hat{h}_u|^2 \hat{E}_{s,u},$$

$$u = 1, \ldots, U.$$

Note that computation of the signal energy $\hat{E}_{s,n}$ is quite intricate, including e.g. the involved beta factors.

1.4 Computation of $N_u^{G+}$
1.4.1 White Noise Power Floor

The idea here is to rely on the baseline thermal noise power floor estimation algorithm to estimate the thermal noise power floor before any G-rake+ processing. A main problem then arises since the thermal noise is scaled by $\hat{w}_u$ when the sufficient statistics is evaluated. This means that the thermal noise power level will no longer appear constant.

The approach taken here to circumvent this problem builds on the calculation of the scale factor by which the thermal noise power is scaled. To compute this quantity, first note that when the wideband thermal noise power floor is estimated before G-rake+ processing, e.g. with the baseline noise floor estimator, the following quantity is estimated $$\hat{N} = \frac{1}{M}\sum_{m=1}^{M}\sum_{k=1}^{K}(N_{u,k}^m)^H N_{u,k}^m \xrightarrow{M\to\infty} KE[(N_{u,k})^H N_{u,k}] = \quad (A10)$$

$$KP_{N_{u,k}} = K\frac{1}{K}P_N = N_0,$$

where $N_0$ is the thermal noise power floor and where m is the sample summation index. The power at the sufficient statistics signal processing point is however $$\hat{N}^{G+} = \frac{1}{M}\sum_{m=1}^{M}\sum_{k=1}^{K}(\hat{w}_u^H N_{u,k}^m)^H \hat{w}_u^H N_{u,k}^m = \frac{1}{M}\sum_{m=1}^{M}\sum_{k=1}^{K} tr((\hat{w}_u^H N_{u,k}^m)^H \hat{w}_u^H N_{u,k}^m) \quad (A11)$$

$$= \frac{1}{M}\sum_{m=1}^{M}\sum_{k=1}^{K} tr(\hat{w}_u^H N_{u,k}^m (\hat{w}_u^H N_{u,k}^m)^H) = \frac{1}{M}\sum_{m=1}^{M}\sum_{k=1}^{K} tr(\hat{w}_u^H N_{u,k}^m (N_{u,k}^m)^H \hat{w}_u)$$

$$= tr\left(\sum_{k=1}^{K}\hat{w}_u^H\left(\frac{1}{M}\sum_{m=1}^{M} N_{u,k}^m (N_{u,k}^m)^H\right)\hat{w}_u\right) \xrightarrow{M\to\infty}$$

$$tr(K\hat{w}_u^H E[N_{u,k}(N_{u,k})^H]\hat{w}_u)$$

$$= tr(K\hat{w}_u^H (N_0/K)I\hat{w}_u) = \hat{w}_u^H \hat{w}_u N_0 = \hat{w}_u^H \hat{w}_u \hat{N}.$$

The conclusion is that the thermal noise floor at the sufficient statistics signal point can be obtained from the noise floor estimate before G-rake+ processing, by a multiplication with the scale factor $$\kappa_u^{G+} = (\hat{w}_u)^H \hat{w}_u, u=1,\ldots,U. \quad (A12)$$

This gives $$N_u^{G+} = \kappa_u^{G+}\hat{N}, u=1,\ldots,U \quad (A13)$$

The computation of the scale factor requires an additional inner product for each user.

1.4.2 Colored Noise Power Floor

This subsection discusses the case where the result of (A10) is replaced by the more general assumption $$\frac{1}{M}\sum_{m=1}^{M}\sum_{k=1}^{K} N_{u,k}^m (N_{u,k}^m)^H \xrightarrow{M\to\infty} KE[N_{u,k}(N_{u,k})^H] = K\frac{N_0}{K}R_N = N_0 R_N, \quad (A14)$$

i.e. the case when sampling is fast enough to reflect the shape of the uplink spectrum. In this case it follows that (A10) is transformed to $$\hat{N} = \frac{1}{M}\sum_{m=1}^{M}\sum_{k=1}^{K}(N_{u,k}^m)^H N_{u,k}^m \xrightarrow{M\to\infty} KE[(N_{u,k})^H N_{u,k}] = \quad (A15)$$

$$Ktr(E[N_{u,k}(N_{u,k})^H]) = N_0 tr(R_N)$$

Furthermore, (A11) is transformed into $$\hat{N}^{G+} = N_0 tr(\hat{w}_u^H R_N \hat{w}_u). \quad (A16)$$

The end result in this case is the scale factor $$\kappa_u^{G+} = \frac{tr(\hat{w}_u^H R_N \hat{w}_u)}{tr(R_N)} \quad (A17)$$

1.5 Computation of $I_u^{G+}$ Using Available SINRs

The code power to interference ratio is, $$(C/I)_u^{G+} = \frac{S_u^{G+}}{I_u^{G+} + N_u^{G+}}, u=1,\ldots,U. \quad (A18)$$

It can be noted that in (A18), all quantities except $I_u^{G+}$ have been computed, see (A11) and (A13). Using these quantities, (A18) can be solved for $I_u^{G+}$ giving $$I_u^{G+} = \frac{S_u^{G+}}{(C/I)_u^{G+}} - \kappa_u^{G+}\hat{N}, u=1,\ldots,U. \quad (A19)$$

The quantity $(C/I)_u^{G+}$ can be directly related to SINR. This is performed as $$(C/I)_u^{G+} = \frac{(\beta_{u,DPCCH}^2 + \beta_{u,EDPCCH}^2 + n_{u,codes}\beta_{u,EDPDCH}^2)}{\beta_{u,DPCCH}^2 SF_{u,DPCCH}} SINR_u^{G+} = \quad (A20)$$

$$\frac{\beta_{u,effectiv3}^2}{SF_{u,DPCCH}} SINR_u^{G+}$$

which gives $$I_u^{G+} = \frac{S_u^{G+}}{(C/I)_u^{G+}} - \kappa_u^{G+}\hat{N} = \frac{SF_{u,DPCCH}}{\beta_{u,effective}^2} \frac{S_u^{G+}}{SINR_u^{G+}} - \kappa_u^{G+}\hat{N}. \quad (A21)$$

1.6 Computation of $RoT_u^{G+}$

When (A9), (A13) and (21) are inserted in (A5), the end result becomes $$RoT_u^{G+} \equiv \frac{S_u^{G+} + I_u^{G+} + \kappa_u^{G+}\hat{N}}{\kappa_u^{G+}\hat{N}} = \frac{S_u^{G+}}{\kappa_u^{G+}\hat{N}}\left(1 + \frac{SF_{u,DPCCH}}{\beta_{u,effective}^2} \frac{1}{SINR_u^{G+}}\right), \quad (A22)$$

$$u=1,\ldots,U.$$

These measures, for each user, are then combined into an uplink measure as outlined below. Note that (A22) provides some interesting insights. When SINR is high then the RoT for the user is essentially determined by the remaining own power of the user—the RoT then increases when the SINR gets worse.

1.7 Uplink Load Measure for G-Rake+

It is clear that that the user that sees the maximum total load is the one worst off in terms of coverage and stability. That user is hence used to address the load of the UL of the cell. The worst case load is defined by the equations $$u_{max} = \arg_u \max(RoT_u^{G+}) \quad (A23)$$

$$\max(RoT_u^{G+}) = RoT_{u_{max}}^{G+} \quad (A24)$$

2 Annex B—FDPE RoT

2.1 The Signal After FDPE

The pre-equalized wideband signal in the frequency domain, denoted $Z_{pre}(m)$, is given by:

$$Z_{pre}(m) = W_{pre}(m)H(m)Z(m) + W_{pre}(m)I(m) + W_{pre}(m)N^{thermal}(m). \quad (B1)$$

$W_{pre}(m)$ denotes the wideband pre-equalizing filter in the frequency domain, $H(m)$ denotes the wideband net channel response in the frequency domain, $Z(m)$ denotes the wideband transmitted signal in the frequency domain, $I(m)$ denotes the wideband neighbor cell interference in the frequency domain and $N^{thermal}(m)$ denotes the wideband thermal noise floor signal in the frequency domain. The equation (B1) is readily transformed to the time domain with an inverse discrete Fourier transformation, rendering $$z_{pre}(t) = (w_{pre}h)(t)*z(t) + w_{pre}(t)*i(t) + (t)*n^{thermal}(t) \quad (B2)$$

where the star denotes (multi-dimensional) convolution $z_{pre}(t)$ denotes the pre-equalized wideband signal in the time domain, $w_{pre}(t)$ denotes the wideband finite impulse response of the pre-equalizing filter in the time domain, $h(t)$ denotes the wideband finite impulse response net channel response in the time domain, $z(t)$ denotes the wideband transmitted signal in the time domain, $i(t)$ denotes the wideband neighbor cell interference in the time domain and $n^{thermal}(t)$ denotes the wideband thermal noise floor signal in the time domain. All signal quantities are here given before the pre-equalization step.

2.2 Measuring Load after FDPE

2.2.1 Load Definition

To obtain a measure of the load after FDPE interference whitening the RoT after this step is considered. This is in fact more appealing than for the G-rake+ receiver in that the whole uplink load is addressed at the same time. The RoT measure after FDPE processing is given by $$RoT^{FDPE}(t) = \frac{z_{pre}^H(t)z_{pre}(t)}{E[(w_{pre}(t)*n^{thermal}(t))^H (w_{pre}(t)*n^{thermal}(t))]} \quad (B3)$$

2.2.2 Computation of the Numerator of (B3)

The numerator of (B3) is straightforward to compute. Noting that the time scale for the RoT measurement in WCDMA is normally a transmission time interval (TTI), it follows that the numerator of (14) can be computed e.g. by an average of time samples over the TTI of interest (typically 2 ms or 10 ms).

2.2.3 Computation of the Denominator of (B3)

The computation of the denominator of (B3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E[(w_{pre}(t)*n^{thermal}(t))^H (w_{pre}(t)*n^{thermal}(t))] = \quad (B4)$$

$$E\left[\sum_{l_1=0}^{L-1}(n^{thermal}(t-l_1))^H w_{pre}^H(l_1)\sum_{l_2=0}^{L-1}w_{pre}(l_2)n^{thermal}(t-l_2)\right] =$$

$$E\left[\sum_{l_1=0}^{L-1}\sum_{l_2=0}^{L-1}(n^{thermal}(t-l_1))^H w_{pre}^H(l_1)w_{pre}(l_2)n^{thermal}(t-l_2)\right] =$$

$$E\left[\sum_{l_1=0}^{L-1}\sum_{l_2=0}^{L-1}w_{pre}^H(l_1)w_{pre}(l_2)(n^{thermal}(t-l_1))^H n^{thermal}(t-l_2)\right] =$$

$$\sum_{l_1=0}^{L-1}\sum_{l_2=0}^{L-1}w_{pre}^H(l_1)w_{pre}(l_2) E[(n^{thermal}(t-l_1))^H n^{thermal}(t-l_2)]$$

$$\sum_{l_1=0}^{L-1}\sum_{l_2=0}^{L-1}w_{pre}^H(l_1)w_{pre}(l_2)\delta_{l_1,l_2}\sum_{a=1}^{A}\hat{N}_a^{thermal} =$$

$$\left(\sum_{l=0}^{L-1}w_{pre}^H(l)w_{pre}(l)\right)\left(\sum_{a=1}^{A}\hat{N}_a^{thermal}\right).$$

In (B4) $\hat{N}_a^{thermal}$ denotes the estimated thermal noise floor of antenna branch a, before pre-equalization. This means that conventional noise floor estimation algorithms can be re-used. Exemplary noise estimation algorithms are described in T. Wigren and P. Hellqvist, "Estimation of uplink WCDMA load in a single RBS", Proc.IEEE VTC-2007 Fall, Baltimore, Md., USA, Oct. 1-3, 2007; T. Wigren, "Soft uplink load estimation in WCDMA", IEEE Trans Veh. Tech., March, 2009; and T. Wigren, "Recursive noise floor estimation in WCDMA", IEEE Trans. Veh. Tech., vol. 59, no. 5, pp. 2615-2620, 2010. One algorithm is needed for each antenna branch.

2.2.4 Load Estimate and Block Diagram

Combining (B3) and (B4) results in $$RoT^{FDPE} = \frac{z_{pre}^H(t)z_{pre}(t)}{\left(\sum_{l=0}^{L-1}w_{pre}^H(l)w_{pre}(l)\right)\left(\sum_{a=1}^{A}\hat{N}_a^{thermal}\right)}. \quad (B5)$$

The quantities above should be computed as averages or estimates over a time interval where the whitening filter of the FDOE remains constant. The result is intuitive. Since the total received wideband power is summed over all antenna branches, so is the thermal noise power floor. The RoT after FDPE is also scaled with the power of the pre-whitening filter. A block diagram of the load estimation solution is depicted in Figure C1. Only the FDPE blocks are shown there. As can be seen, the main advantage of the FDPE is that the processing is user independent.

3 Annex C—FDE RoT

3.1 The Signal after FDE

The pre-equalized wideband signal in the frequency domain for user u, denoted $Z_{FDE,u}(m)$, is given by:

$$Z_{FDE,u}(m) = W_u(m)H_u(m)Z(m) + W_u(m)I(m) + W_u(m)N^{thermal}(m).$$

$W_u(m)$ denotes the wideband MMSE equalizing filter in the frequency domain, $H_u(m)$ denotes the wideband net channel response in the frequency domain, $Z(m)$ denotes the wideband transmitted signal in the frequency domain, $I(m)$ denotes the wideband neighbor cell interference in the frequency domain and $N^{thermal}(m)$ denotes the wideband thermal noise floor signal in the frequency domain. All signals are vector valued. The equation (C1) is readily transformed to the time domain with an inverse discrete Fourier transformation, rendering $$Z_{FDE,u}(t) = (w_u h_u)(t)*z(t) + w_u(t)*i(t) + w_u(t)*n^{thermal}(t), \quad (C2)$$

where the star denotes (multi-dimensional) convolution, $z_{pre,u}(t)$ denotes the equalized wideband signal in the time domain, $w_u(t)$ denotes the wideband finite impulse response of the equalizing filter in the time domain, $h_u(t)$ denotes the wideband finite impulse response net channel response in the time domain, $z(t)$ denotes the wideband transmitted signal in the time domain, $i(t)$ denotes the wideband neighbor cell interference in the time domain and $n^{thermal}(t)$ denotes the wideband thermal noise floor signal in the time domain.

3.2 Measuring Load after FDE

3.2.1 Load Definition

To obtain a measure of the load after the FDE interference whitening, the RoT after this step is considered. The RoT measure after FDPE processing is given by $$RoT_u^{FDE}(t) = \frac{z_{FDE,u}^H(t) z_{FDE,u}(t)}{E[(w_u(t)*n^{thermal}(t))^H (w_n(t)*n^{thermal}(t))]} \quad (C3)$$

3.2.2 Computation of the numerator of (C3)

The numerator of (C3) is straightforward to compute. Noting that the time scale for the RoT measurement in WCDMA is normally a transmission time interval (TTI), it follows that the numerator of (12) can be computed e.g. by an average of time samples over the TTI of interest (typically 2 ms or 10 ms).

3.2.3 Computation of the Denominator of (C3)

The computation of the denominator of (C3) requires an evaluation of the expectation of that expression. This can be done assuming the thermal noise to be white and stationary, which is a standard assumption. Note that the evolution here therefore is performed over the time interval where the pre-equalization filter remains constant. It then follows that $$E[(w_u(t)*n^{thermal}(t))^H H(w_u(t)*n^{thermal}(t))] = \quad (C4)$$

$$E\left[\sum_{l_1=0}^{L-1}(n^{thermal}(t-l_1))^H w_u^H(l_1)\sum_{l_2=0}^{L-1} w_u(l_2) n^{thermal}(t-l_2)\right] =$$

$$E\left[\left(\sum_{l_1=0}^{L-1}\sum_{l_2=0}^{L-1}(n^{thermal}(t-l_1))^H w_u^H(l_1) w_u(l_2) n^{thermal}(t-l_2)\right)\right] =$$

$$E\left[\sum_{l_1=0}^{L-1}\sum_{l_2=0}^{L-1} w_u^H(l_1) w_u(l_2) (n^{thermal}(t-l_1))^H n^{thermal}(t-l_2)\right] =$$

$$\sum_{l_1=0}^{L-1}\sum_{l_2=0}^{L-1} w_u^H(l_1) w_u(l_2) E[(n^{thermal}(t-l_1))^H n^{thermal}(t-l_2)]$$

$$\sum_{l_1=0}^{L-1}\sum_{l_2=0}^{L-1} w_u^H(l_1) w_u(l_2) \delta_{l_1,l_2} \sum_{a=1}^{A} \hat{N}_a^{thermal} =$$

$$\left(\sum_{l=0}^{L-1} w_u^H(l) w_u(l)\right)\left(\sum_{a=1}^{A} \hat{N}_a^{thermal}\right).$$

In (C4) $\hat{N}_a^{thermal}$ denotes the estimated thermal noise floor of antenna branch a, before pre-equalization. This means that prior art noise floor estimation algorithms of [1]-[3] can be re-used. One algorithm is needed for each antenna branch.

3.2.4 Load Estimate

Combining (C3) and (C4) results in $$RoT_u^{FDE} = \frac{z_{FDE,u}^H(t) z_{FDE,u}(t)}{\left(\sum_{l=0}^{L-1} w_u^H(l) w_u(l)\right)\left(\sum_{a=1}^{A} \hat{N}_a^{thermal}\right)}, u=1,\ldots,U \quad (C5)$$

The quantities above should be computed as averages or estimates over a time interval where the equalizing filter of the FDE remains constant. The result is intuitive. Since the total received wideband power is summed over all antenna branches, so is the thermal noise power floor. The RoT after FDE is also scaled with the power of the equalizing filter.

3.2.4.1 Combination of Users

The above discussion has focused on a single user. However, what is interesting is a load measure for the complete uplink. Since it is likely that it is the user that experiences the highest load that limits the uplink, the uplink load is defined to be $$RoT = \max_u RoT_u^{FDE}, \quad (C6)$$

where $RoT_u^{FDE}$ is the noise rise of user u.

What is claimed is:

1. A method of scheduling uplink transmissions from a plurality of users to a base station in a wireless communication network, the method comprising:
    estimating interference suppression gains in received signals for two or more candidate user constellations defined by number of users and corresponding data rates;
    computing predicted loads for a scheduling interval for each of the two or more candidate user constellations as a function of the estimated interference suppression gains for the candidate user constellations;
    selecting one of the candidate user constellations for the scheduling interval based on the predicted loads
    scheduling uplink transmissions from a set of users according to the selected user constellation.

2. The method of claim 1 wherein scheduling the uplink transmissions from the set of users according to the selected user constellation comprises scheduling a predetermined number of users and assigning corresponding bit rates to the scheduled users according to the selected user constellation.

3. The method of claim 1 wherein computing the predicted loads for at least one scheduling interval for each of the two or more candidate user constellations comprises:
   computing predicted air interface loads for each of the candidate user constellations; and
   adjusting the predicted air interface loads based on corresponding interference suppression gains for the candidate user constellations to obtain the predicted loads for each candidate user constellation.

4. The method of claim 1 wherein estimating interference suppression gains for two or more candidate user constellations comprises obtaining predetermined interference suppression gains for the two or more candidate user constellations from a gain table stored in memory of the base station.

5. The method of claim 4 wherein the predetermined interference suppression gains comprise average interference suppressions gains for the two or more candidate user constellations over a plurality of scheduling intervals.

6. The method of claim 4 further comprising interpolating interference suppression gains for one of the two or more candidate user constellations with no corresponding interference suppression gain in the gain table.

7. The method of claim 5 further comprising updating the gain table to include information for a current scheduling interval by recomputing one or more of the predetermined interference suppression gains.

8. The method of claim 7 wherein recomputing one or more of the predetermined interference suppression gains comprises:
   determining a current user constellation for the current scheduling interval;
   computing an interference suppression gain for the current user constellation; and
   recomputing the average interference suppression gain for the current user constellation to include the interference suppression gain for the current scheduling interval.

9. The method of claim 8 wherein determining a current user constellation for the current scheduling interval comprises:
   determining a number of users transmitting data on the uplink in the current scheduling interval; and
   determining the transport formats for the users transmitting data on the uplink in the current scheduling interval.

10. The method of claim 8 wherein computing the interference suppression gain for the current user constellation comprises computing a difference between an uplink load before interference suppression and an uplink load after interference suppression.

11. The method of claim 10 wherein computing a difference between the uplink load before interference suppression and the uplink load after interference suppression comprises:
   computing rise over thermal before interference suppression and rise over thermal after interference suppression;
   computing a load factor before interference suppression from the computed rise over thermal before interference suppression;
   computing a load factor after interference suppression from the computed rise over thermal after interference suppression; and
   computing a difference between the load factor before interference suppression and the load factor after interference suppression.

12. The method of claim 11 wherein computing load factors before and after interference suppression comprises:
   estimating neighbor cell interference and thermal noise;
   computing the load factor before interference suppression as a function of the neighbor cell interference, thermal noise, and rise over thermal before interference suppression; and
   computing the load factor after interference suppression as a function of the neighbor cell interference, thermal noise, and rise over thermal after interference suppression.

13. The method of claim 10 wherein computing the difference between the uplink load before interference suppression and the uplink load after interference suppression comprises:
   computing rise over thermal before interference suppression and rise over thermal after interference suppression; and
   computing a difference between the rise over thermal before interference suppression and the rise over thermal after interference suppression.

14. The method of claim 13 wherein the rise over thermal after interference suppression is computed as the maximum rise over thermal for the users in the current user constellation.

15. The method of claim 1 wherein the interference suppression gains represent the gain as a fraction of a total cell load.

16. The method of claim 1 further comprising computing a variance of the interference suppression gain for each user constellation, wherein the computation of the predicted load is further based on the variance of the interference suppression gain.

17. The method of claim 1 further comprising scheduling the users in a plurality of recurring time slots in a time division multiplexing transmission scheme.

18. The method of claim 17 wherein predicted loads for a plurality of candidate user constellations are computed for each time slot, and wherein users are scheduled in each time slot according to a selected one of the candidate user constellations for each time slot based on the predicted loads.

19. A base station in a wireless communication network, the base station comprising:
   an interference suppression receiver to suppress interference in received signals from a plurality of users; and
   a control circuit including a scheduler for scheduling uplink transmissions from the users, the scheduler being configured to:
   estimate interference suppression gains in received signals for two or more candidate user constellations defined by number of users and corresponding data rates;
   compute predicted loads for a scheduling interval for each of the two or more candidate user constellations as a function of the estimated interference suppression gains for the candidate user constellations;
   select one of the candidate user constellations for the scheduling interval based on the predicted loads; and
   schedule uplink transmissions from a set of users according to the selected user constellation.

20. The base station of claim 19 wherein the scheduler is configured to schedule a set of users by:
   scheduling a predetermined number of users; and
   assigning corresponding bit rates to the scheduled users according to the selected user constellation.

21. The base station of claim 19 wherein the scheduler is configured to compute predicted loads for at least one scheduling interval for each of the two or more candidate user constellations by:
   computing predicted air interface loads for each of the candidate user constellations; and adjusting the predicted air interface loads based on corresponding interference suppression gains for the candidate user constellations to obtain the predicted loads for each candidate user constellation.

22. The base station of claim 19 wherein the scheduler is configured to estimate interference suppression gains for two or more candidate user constellations by obtaining predetermined interference suppression gains for the candidate user constellations from a gain table stored in memory of the base station.

23. The base station of claim 22 wherein the scheduler is further configured to interpolate interference suppression gains for one of the two or more candidate user constellations with no corresponding interference suppression gain in the gain table.

24. The base station of claim 22 wherein the predetermined interference suppression gains comprise average interference suppressions gains for the user constellations over a plurality of scheduling intervals.

25. The base station of claim 23 wherein the scheduler is further configured to update the gain table to include information for a current scheduling interval by recomputing one or more of the predetermined interference suppression gains.

26. The base station of claim 25 wherein the scheduler is configured to recompute one or more of the predetermined interference suppression gains by:
  determining a current user constellation for the current scheduling interval;
  computing an interference suppression gain for the current user constellation; and
  recomputing the average interference suppression gain for the current user constellation to include the interference suppression gain for the current scheduling interval.

27. The base station of claim 26 wherein the scheduler is configured to determine a current user constellation for the current scheduling interval by:
  determining a number of users transmitting data on the uplink in the current scheduling interval; and
  determining the transport formats for the users transmitting data on the uplink in the current scheduling interval.

28. The base station of claim 26 wherein the scheduler is configured to compute the interference suppression gain for the current user constellation by computing a difference between an uplink load before interference suppression and an uplink load after interference suppression.

29. The base station of claim 28 wherein the scheduler is configured to compute a difference between the uplink load before interference suppression and the uplink load after interference suppression by:
  computing rise over thermal before interference suppression and rise over thermal after interference suppression;
  computing a load factor before interference suppression from the computed rise over thermal before interference suppression;
  computing a load factor after interference suppression from the computed rise over thermal after interference suppression; and
  computing a difference between the load factor before interference suppression and the load factor after interference suppression.

30. The base station of claim 29 wherein the scheduler is configured to compute load factors before and after interference suppression by:
  estimating neighbor cell interference and thermal noise;
  computing the load factor before interference suppression as a function of the neighbor cell interference, thermal noise, and rise over thermal before interference suppression; and
  computing the load factor after interference suppression as a function of the neighbor cell interference, thermal noise, and rise over thermal after interference suppression.

31. The base station of claim 28 wherein the scheduler is configured to compute a difference between the uplink load before interference suppression and the uplink load after interference suppression by:
  computing rise over thermal before interference suppression and rise over thermal after interference suppression; and
  computing a difference between the rise over thermal before interference suppression and the rise over thermal after interference suppression.

32. The base station of claim 31 wherein the rise over thermal after interference suppression is computed as the maximum rise over thermal for the users in the current user constellation.

33. The base station of claim 19 wherein the interference suppression gains represent the gain as a fraction of a total cell load.

34. The base station of claim 19 wherein the scheduler is further configured to compute a variance of the interference suppression gain for each user constellation, and wherein the computation of the predicted load is further based on the variance of the interference suppression gain.

35. The base station of claim 19 further comprising scheduling the users in a plurality of recurring time slots in a time division multiplexing transmission scheme.

36. The base station of claim 35 wherein predicted loads for a plurality of candidate user constellations are computed for each time slot, and wherein users are scheduled in each time slot according to a selected one of the candidate user constellations for each time slot based on the predicted loads.

* * * * *

UNITED STATES PATENT AND TRADEMARK OFFICE
CERTIFICATE OF CORRECTION

PATENT NO. : 9,320,053 B2
APPLICATION NO. : 13/314775
DATED : April 19, 2016
INVENTOR(S) : Wigren It is certified that error appears in the above-identified patent and that said Letters Patent is hereby corrected as shown below:

On the Title Page, in item (74), under "Attorney, Agent, or Firm", in Column 2, Line 1, delete "Coats & Bennet, PLLC" and insert -- Coats & Bennett, PLLC --, therefor.

In the Specification

In Column 3, Lines 21-22, delete "base station 20." and insert -- base station 100. --, therefor.

In Column 5, Line 62, delete "$L_{own}$," and insert -- $L_{own}$ --, therefor.

In Column 8, Lines 43-44, delete "RAKE combiner 210" and insert -- RAKE combiner 220 --, therefor.

In Column 10, Lines 8-9, delete $$W_u(m) = H_u^H(m)(H_u(m)H_u^H(m)+I(m)I^H(m)+(N(m))^H N(m))^{-1}, \ldots u=1,\ldots,U$$

" $W_u(m) =$ " and insert -- $H_u^H(m)\bigl(H_u(m)H_u^H(m)+I(m)I^H(m)+(N(m))^H N(m)\bigr)^{-1}, \ldots u=1,\ldots,U$ --, therefor.

In Column 11, Line 41, delete "covariance estimation circuit 470" and insert -- covariance estimation circuit 450 --, therefor.

In Column 13, Lines 47-48, delete " $=\alpha_4\bigl)(\Delta L_{own}^{IS})^2\bigr)(t)$ " and insert -- $\alpha_4\bigl((\Delta I_{own}^{IS})^2\bigr)(t)$ --, therefor.

In Column 16, Line 12, delete "u+1," and insert -- u=1, --, therefor.

Signed and Sealed this
Ninth Day of August, 2016

Michelle K. Lee
*Director of the United States Patent and Trademark Office*

CERTIFICATE OF CORRECTION (continued)

U.S. Pat. No. 9,320,053 B2

In Column 16, Line 31, delete "$k \epsilon \chi_u.$" and insert -- $k \in \Omega_u.$ --, therefor.

In Column 16, line 37, delete "$|e^{u,k}|^2$" and insert -- $|e_{u,k}|^2$ --, therefor.

In Column 16, Line 54, delete "$\hat{E}_{s,n}$" and insert -- $\hat{E}_{s,u}$ --, therefor.

In Column 18, Line 46, delete "$\beta^2_{u,effectiv3}$" and insert -- $\beta^2_{u,effective}$ --, therefor.

In Column 20, Lines 12-14, delete "$E\left| \sum_{l_1=0}^{L-1} \sum_{l_2=0}^{L-1} (n^{thermal}(t-l_1))^H w_{pre}^H(l_1) w_{pre}(l_2) n^{thermal}(t-l_2) \right|$" and insert -- $E\left[ \left( \sum_{l_1=0}^{L-1} \sum_{l_2=0}^{L-1} (n^{thermal}(t-l_1))^H w_{pre}^H(l_1) w_{pre}(l_2) n^{thermal}(t-l_2) \right) \right]$ --, therefor.

In Column 21, Line 58, delete "$E[(w_u(t) * n^{thermal}(t))^\wedge H (w_u(t) * n^{thermal}(t))]$" and insert -- $E\left[ (w_u(t) * n^{thermal}(t))^H (w_u(t) * n^{thermal}(t)) \right]$ --, therefor.

In the Claims

In Column 22, Line 62, in Claim 1, delete "loads" and insert -- loads; --, therefor.

In Column 25, Line 20, in Claim 25, delete "claim 23" and insert -- claim 22 --, therefor.